(12) United States Patent
Ishikawa et al.

(10) Patent No.: US 7,953,967 B2
(45) Date of Patent: May 31, 2011

(54) INFORMATION PROCESSING APPARATUS AND PROGRAM

(75) Inventors: Tetsuya Ishikawa, Hachioji (JP);
Tomohiro Suzuki, Nishitokyo (JP);
Tomoya Ogawa, Hachioji (JP);
Fumikage Uchida, Asaka (JP);
Munetoshi Eguchi, Hachioji (JP);
Hiroaki Yago, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 677 days.

(21) Appl. No.: 11/971,599

(22) Filed: Jan. 9, 2008

(65) Prior Publication Data

US 2008/0172556 A1 Jul. 17, 2008

(30) Foreign Application Priority Data

Jan. 12, 2007 (JP) ................................. 2007-004840
Sep. 28, 2007 (JP) ................................. 2007-254760

(51) Int. Cl.
*G06F 7/04* (2006.01)
*G06F 9/00* (2006.01)
*G06F 9/24* (2006.01)
*G06F 12/00* (2006.01)
*G06F 15/177* (2006.01)

(52) U.S. Cl. ..................... 713/2; 713/1; 713/100; 726/2; 726/16; 726/17; 726/21; 726/26

(58) Field of Classification Search .................. 713/1, 2, 713/100, 187; 726/2, 26, 16, 17, 21
See application file for complete search history.

(56) References Cited

U.S. PATENT DOCUMENTS

| | | | |
|---|---|---|---|
| 6,920,553 B1 * | 7/2005 | Poisner | 713/2 |
| 7,308,570 B2 * | 12/2007 | Young et al. | 713/2 |
| 7,591,018 B1 * | 9/2009 | Lee | 726/24 |
| 7,644,218 B2 * | 1/2010 | Deng et al. | 710/302 |
| 2003/0120939 A1 * | 6/2003 | Hughes et al. | 713/191 |
| 2008/0140732 A1 * | 6/2008 | Wilson et al. | 707/201 |

FOREIGN PATENT DOCUMENTS

| | | |
|---|---|---|
| JP | 2002-215399 | 8/2002 |
| JP | 2004-157845 | 6/2004 |

* cited by examiner

*Primary Examiner* — Mark Connolly
(74) *Attorney, Agent, or Firm* — Finnegan, Henderson, Farabow, Garrett & Dunner, L.L.P.

(57) ABSTRACT

An information processing apparatus including: a first recording medium which stores a first program; a connection section which is capable of connecting with a second recording medium from outside; and a controller which determines, during BIOS boot-up operation, whether or not the connection section is connected with the second recording medium which stores predetermined authentication information, and if connected, boots a second program stored in the second recording medium, while if not connected, boots the first program stored in the first recording medium.

10 Claims, 15 Drawing Sheets

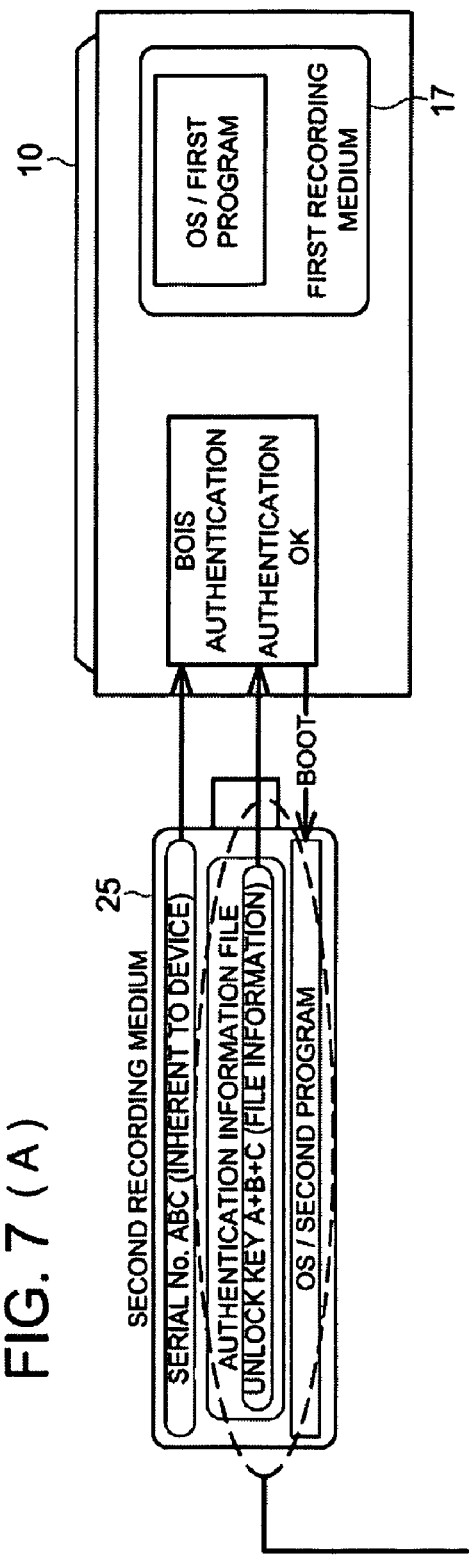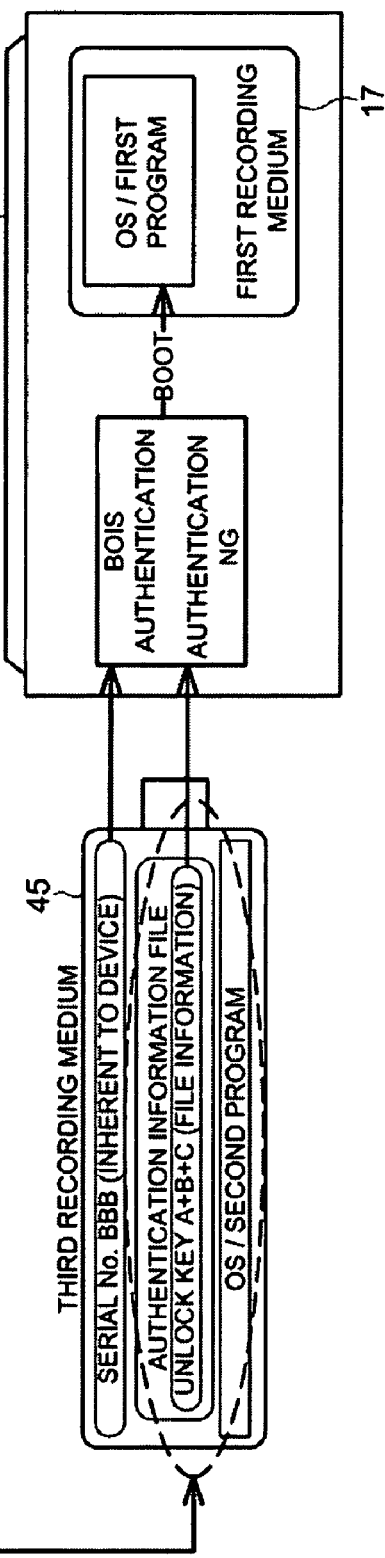

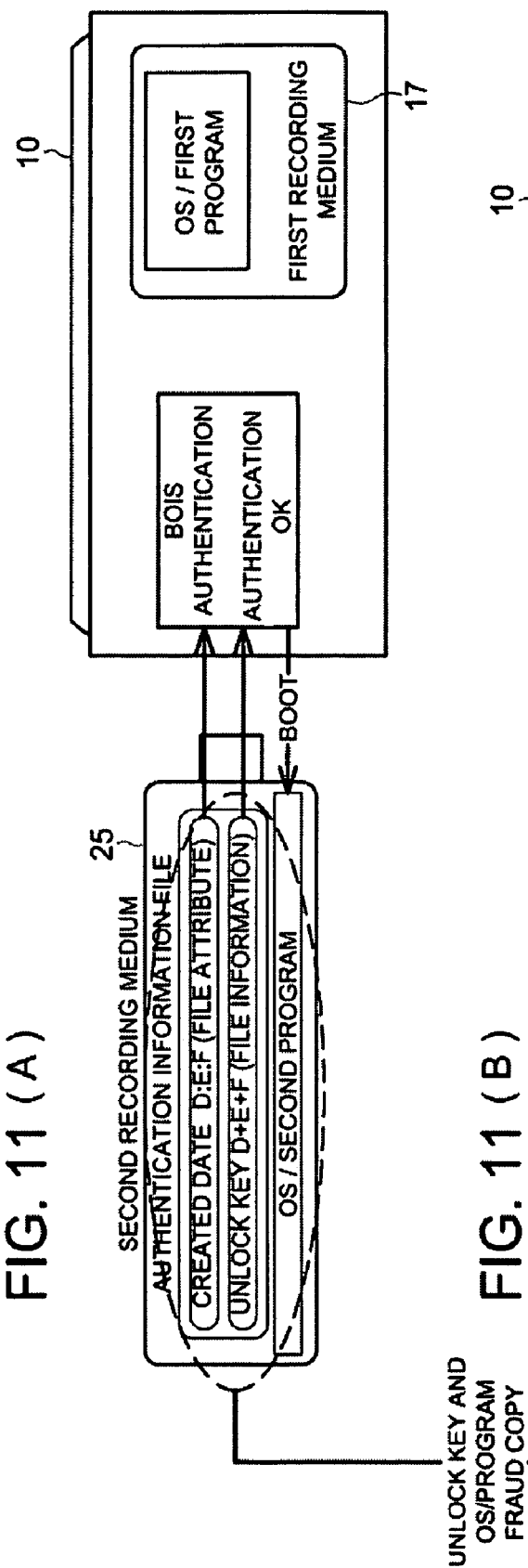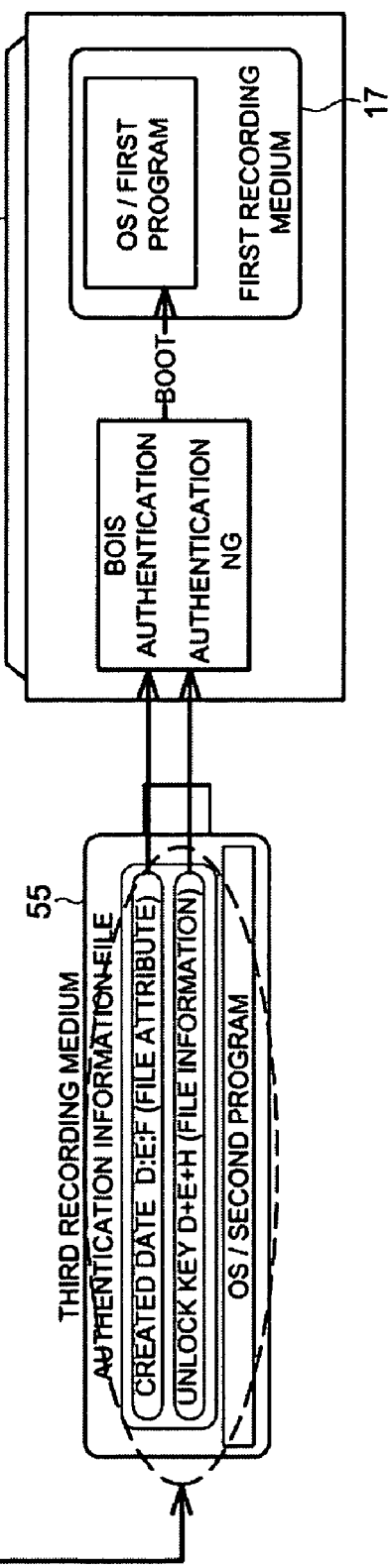
FIG. 11 (A)
FIG. 11 (B)

INFORMATION PROCESSING APPARATUS AND PROGRAM

CROSS REFERENCE TO RELATED APPLICATION

This application is based on Japanese Patent Application No. 2007-00480 and No. 2007-254760 respectively filed on Jan. 12, 2007 and Sep. 28, 2007 with Japanese Patent Office, the entire content of which is hereby incorporated by reference.

BACKGROUND OF THE INVENTION

1. Field of the Invention

The present invention relates to an information processing apparatus provided with a function to control the program boot during the boot-up of the BIOS (Basic Input/Output System), and the program thereof.

2. Background of the Invention

The information processing apparatus such as a printer, photocopier and multifunction peripheral used in an office is maintained by the service personnel to keep the initial performances and to ensure correct operations under operating conditions. For example, when the service personnel is to maintain the control system of the information processing apparatus and the objects (operated sections) to be controlled by this control system, the maintenance program for self-diagnosis stored in the recording medium of the information processing apparatus is booted up and maintenance work is performed.

This maintenance program runs on the Operating System (OS) mounted on the information processing apparatus. The power of the information processing apparatus is turned on and the OS (apparatus) is booted. After that, the maintenance program is booted, and the service personnel is then allowed to change the basic setting of the information processing apparatus through the menu screen (setup menu) opened by the maintenance program. Further, the service personnel may be allowed to access the program in the information processing apparatus by taking the predetermined steps.

If these steps are taken by a general user carelessly, a serious trouble may occur to the information processing apparatus. This may involve security problems such as leakage of the data stored in the information processing apparatus. Accordingly, it is a common practice that the personnel (service personnel) wishing to boot up a specific program (maintenance program) takes an authentication step such as inputting of the ID (Identification) or password. Only when the authentication is valid, the specific program boots up.

For authentication of the principal (authentication system at the time of maintenance) for security purposes at the time of maintaining the information processing apparatus, the principal directly enters the ID or password. In addition to this method, a portable recording medium such as a flexible disk cartridge recording the basic password is set on the medium reader connected to the information processing apparatus, and the basic password is obtained from the portable recording medium. Alternatively, the one-time password is obtained from the service center via the communications line, whereby the authentication section inside the apparatus determines the validity of such authentication data having been obtained (see for example, Japanese Unexamined Patent Application Publication No. 2004-157845 (JPA2004-157845)).

In the meantime, in the boot-up processing performed in the computer system, the designation of the booting drive is determined by the setting of the BIOS (BIOS setup menu). Booting is carried out from the drive which has been assigned with the top priority (see for example, Japanese Unexamined Patent Application Publication No. 2002-215399 (JPA2002-215399)). The same boot-up processing applies to the information processing apparatus equipped with a computer system such as a multifunction peripheral.

FIG. 15 shows the flow of boot-up processing in the conventional information processing apparatus. As shown in FIG. 15, when the user or service personnel has turned on the information processing apparatus (Step S201), the initializing program in the BIOS program stored in the ROM (Read Only Memory) of the information processing apparatus is called out and is executed (Step S202). The initialization of the peripheral device (Power On Self Test; POST) including initialization of the video card, checking of the memory and initialization of the device is carried out (Step S203).

Upon completion of initialization of the peripheral device, the booting drive is searched (Step S204). For example, when a flexible disk cartridge drive, HDD (Hard Disk Drive), CD-ROM (Compact Disk Read Only Memory) drive, removable disk or memory card (recording medium) is mounted on the information processing apparatus, the boot-up order is determined by the setting of the BIOS.

When the top priority is assigned to the recording medium (CF) such as the Compact Flash (CF) (trademark registered by SanDisk, U.S.A.) mounted in the information processing apparatus by the setting of the BIOS, the program is booted from that recording medium (CF). To be more specific, the Master Boot Record (MBR) of the recording medium (CF) as the first boot device is loaded in the memory, and the control transfers to the boot program written there (Step S205).

The boot program searches the boot partition (Step S206) to find out the leading position of the boot partition from the partition table, and loads the boot sector in the memory (Step S207).

The program recorded on the boot sector loads the OS loader in the memory and transfers control to the OS (Step S208). The OS boots up the program that controls the operation of the information processing apparatus (Step S209), whereby the information processing apparatus is enabled.

As described above, in the conventional information processing apparatus, the default booting drive is set on the recording medium (memory card) such as the Compact Flash mounted inside the information processing apparatus. Even if the USB (Universal Serial Bus) drive released to the user or service personnel is connected with an external UBS memory device that has been enabled, booting starts from the booting drive in the apparatus assigned with the top priority, namely, from the recording medium such as Compact Flash.

In the information processing apparatus loaded with the booting OS of the apparatus and a specific program (maintenance program) running on this OS, one may wish to change or update the specific program in order to correct the specific program failure and to improve the function. However, since the program runs on the booting OS of the information processing apparatus, any attempt to change or update the program is subjected to the restriction of the OS. Alternatively, the OS will have to be updated in conformity to the change or updating of the program.

Further, when the OS is booted by the booting device inside the information processing apparatus, or the program stored in the external device such as a USB memory is to be executed under this OS, the program of the external device must be made to conform to the OS of the apparatus. Thus, when the program of the external device is to be changed or updated, the restriction of the OS of the apparatus cannot be avoided.

Alternatively, the OS of the apparatus must be changed in conformity to the change or updating of the program of the external device.

Further, when one wishes to boot from the program stored in the external device (e.g., USB memory), the external device must be assigned on the BIOS setup menu with a higher priority than that of the device (e.g., Compact Flash) inside the information processing apparatus. As described above, due to the security problem for the general users, the BIOS-setup menu is not released to the user. To be more specific, if the BIOS setup menu is released to the user, the information processing apparatus will be booted by the general OS such as the DOS (Disk Operating System) and Windows (trademark registered by Microsoft, U.S.A.) and the program stored in the device of the apparatus may be accessed. To eliminate this possibility, settings are determined to ensure that booting starts from the device inside the apparatus, even when an external device has been connected.

It can be assumed that booting starts from the external device by removing the device inside the apparatus assigned with higher boot-up priority (e.g., Compact Flash). However, with consideration given to security, the mechanical structure is so designed that the user cannot remove the internal device.

By contrast, according to the technology disclosed in JPA2004-157845, only when the authentication data such as the basic password obtained from the portable recording medium or the one-time password obtained from the service center via the communications line is valid, a specific program is booted. However, although-security can be ensured, OS restriction cannot be avoided when the maintenance program is changed or updated, because since the maintenance program runs on the booting OS of the apparatus. Alternatively, the OS must be modified in conformity to the change or updating of the maintenance program.

Further, according to the technology disclosed in JPA2002-215399, boot-up processing is applied in such a way that a plurality of booting devices stored in one and the same OS are searched according to the priority at the time of booting the computer system, and booting starts from the device that can be booted. Even when an unauthorized external device that can be booted is connected, if the priority condition is met, booting starts from that external device. Thus, the user may access the program inside the computer system, and security cannot be ensured.

The object of the present invention is to solve above-mentioned problems and to provide an information processing apparatus and program capable of switching the booting drive over to the external recording medium during BIOS boot-up operation, while ensuring the security of the apparatus.

SUMMARY

The following describes the structures reflecting some aspects of the present invention to achieve the aforementioned object:

(1) An information processing apparatus including:
a first: recording medium which stores a first program;
a connection section which is capable of connecting with a second recording medium from outside; and
a controller which determines, during BIOS boot-up operation, whether or not the connection section is connected with the second recording medium which stores predetermined authentication information, and if connected, boots a second program stored in the second recording-medium, while if not connected, boots the first program stored in the first recording medium.

(2) A program for allowing an information processing apparatus to operate in such a way that, during BIOS boot-up operation, the information apparatus determines whether or not the connection section, which is capable of connecting with a second recording medium from outside, is connected with the second recording medium which stores predetermined authentication: information, and if connected, boots a second program stored in the second recording medium, while if not connected, boots the first program stored in the first recording medium.

(3) An information processing apparatus including:
a first recording medium which stores a first program;
a connection section which is capable of connecting with a second recording medium from outside; and
a controller which determines, during BIOS boot-up operation, whether or not (1) an authentication information file containing predetermined authentication information is stored in the second recording medium connected to the connection section, and whether or not (2) a difference between a created date and an updated date, in a file attribute of the authentication information file, is within a predetermined range, and if the above (1) and (2) are verified, boots a second program stored in the second recording medium whereas, if (1) and (2) are not verified, boots the first program.

(4) A program for allowing an information processing apparatus to operate in such a way that, during BIOS boot-up operation, the information apparatus determines whether or not (1) an authentication information file containing predetermined authentication information is stored in a second recording medium connected to the connection section from outside, and whether or not (2) a difference between a created date and an updated date, in a file attribute of the authentication information file, is within a predetermined range, and if the above (1) and (2) are verified, boots a second program stored in the second recording medium whereas, if (1) and (2) are not verified, boots the first program.

(5) An information: processing apparatus including:
a first recording medium which stores a first program;
a connection section which is capable of connecting with a second recording medium from outside; and
a controller which determines, during BIOS boot-up operation, whether or not (1) an authentication information file containing predetermined authentication information is stored in the second recording medium connected to the connection section, and whether or not (2) a created date described in the authentication information file agrees with a created date in the file attribute of the authentication information file, and if the above (1) and (2) are verified, boots a second program stored in the second recording medium whereas, if (1) and (2) are not verified, boots the first program.

(6) A program for allowing an information processing apparatus to operate in such a way that the information processing apparatus determines, during BIOS boot-up operation, whether or not (1) an authentication information file containing predetermined authentication information is stored in the second recording medium connected to the connection section, and whether or not (2) a created date described in the authentication information file agrees with a created date in the file attribute of the authentication information file, and if the above (1) and (2) are verified, boots a second program stored in the second recording medium whereas, if 1) and (2) are not verified, boots the first program.

(7) An information processing apparatus including:
a first recording medium for storing a first program;
a connection section which is capable of connecting with a second recording medium from outside; and a controller which determines, during BIOS boot-up operation, whether or not there is agreement between the result of using a specific function to compute the information inherent to the second recording medium held in the second recording medium connected to the aforementioned connection section, and the predetermined authentication information stored in the second recording medium; and, if this has been verified, the second program stored in the aforementioned second recording medium is booted; whereas, if this cannot be verified, the first program is: booted.

(8) A program for allowing an information processing apparatus to operate in such a way that, during BIOS boot-up operation, the information processing apparatus determines whether or not there is agreement between the result of using a specific function to compute the information inherent to the second recording medium held in the second recording medium connected to the connection section which is capable of connecting with a second recording medium from outside, and the predetermined authentication information stored in the second recording medium; and, if this has been verified, the second program stored in the aforementioned second recording medium is booted; whereas, if this cannot be verified, the first program stored in the first recording medium is booted.

(9) An information processing apparatus including:
a first recording medium for storing a first program;
a connection section which is capable of connecting with a second recording medium from outside; and
a controller which determines, during BIOS boot-up operation, whether or not there is agreement between the result of using a specific function to compute the created date in the file attribute of a predetermined file recorded in the second recording medium connected to the aforementioned connection section, and the authentication information stored in this recording medium; and, if this has been verified, the second program stored in the aforementioned second recording medium is booted; whereas, if this cannot be verified, the first program is booted.

(10) A program for allowing an information processing apparatus to operate in such a way that, during BIOS boot-up operation, the information processing apparatus determines whether or not there is agreement between the result of using a specific function to compute the created date in the file attribute of a predetermined file recorded in the second recording medium connected to the connection section which being connected with a second recording medium from the outside, and the predetermined authentication information stored in this recording medium; and, if this has been verified, the second program stored in the aforementioned second recording medium is booted; whereas, if this cannot be verified, the first program stored in the first recording medium is booted.

BRIEF DESCRIPTION OF THE DRAWINGS

These and other objects, advantages and features of the invention will become apparent from the following description thereof taken in conjunction with the accompanying drawings in which:

FIGS. 7(A) and 7(B) are diagrams representing the boot control of the program as the apparatus has been booted up when a genuine external recording medium (A) or a copied external recording medium (B) is respectively connected to the information processing apparatus as a third embodiment of the present invention;

FIGS. 11(A) and 11(B) are diagrams representing the boot control of the program when the apparatus has been booted up as a genuine external recording medium (A) or a copied external recording medium (B) is respectively connected to the information processing apparatus as a fifth embodiment of the present invention;

DETAILED DESCRIPTION OF THE PREFERRED EMBODIMENTS

Referring to drawings, the following describes the embodiments of the present invention:

Embodiment 1

Figure 1:
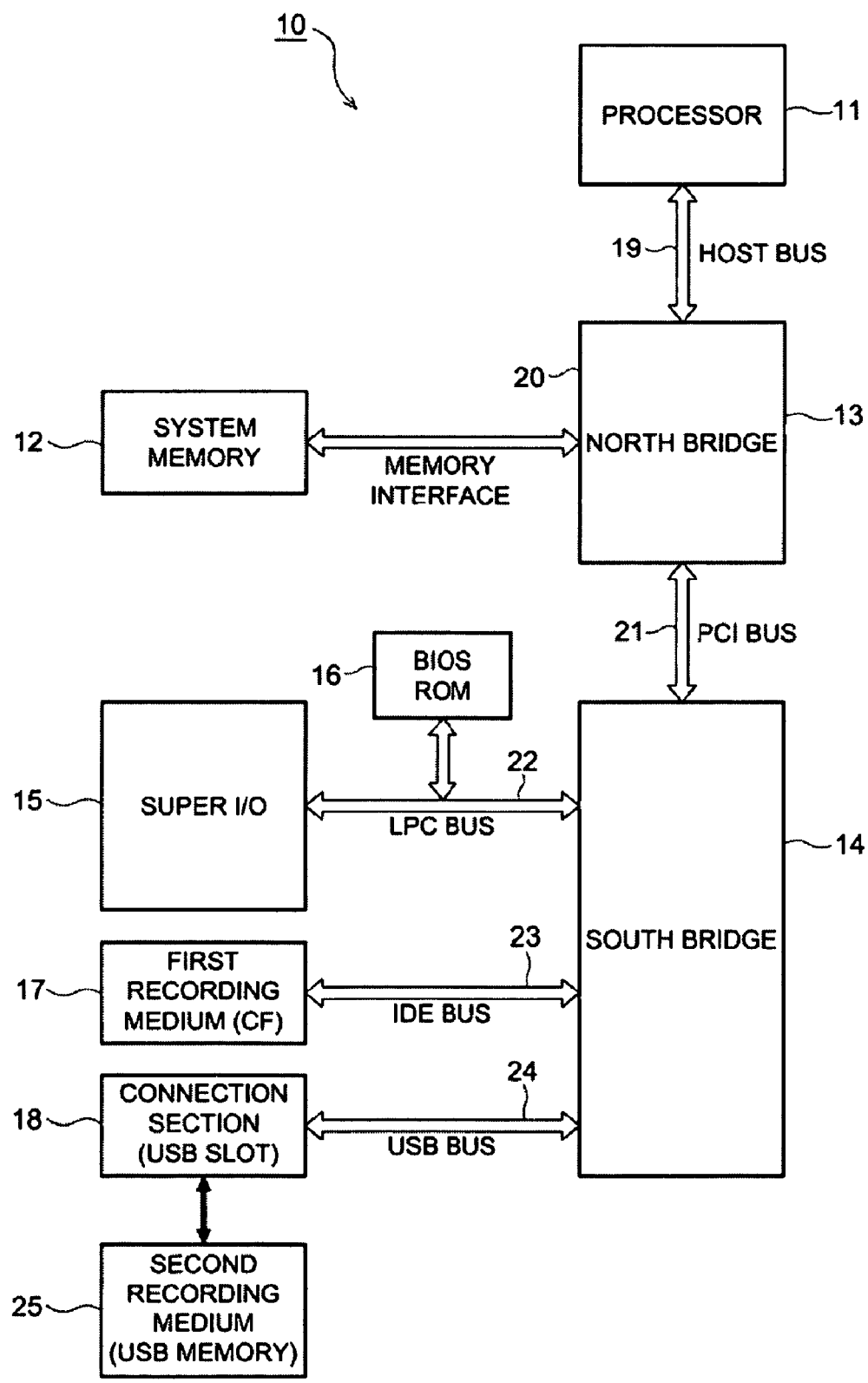
FIG. 1 is a control block diagram representing the major components of the information processing apparatus as a first embodiment of the present invention.

FIG. 1 represents the major components of the information processing apparatus 10 as a first embodiment of the present invention. The information processing apparatus 10 is digital multifunction peripheral provided with the copying function of reading a document, forming the corresponding image on a recording sheet and outputting the image, scanner function, printer function and facsimile function. As shown in FIG. 1, the information processing apparatus 10 is provided with a processor 11, system memory 12, North Bridge 13, South Bridge (South Bridge) 14', Super I/O (Super Input/Output) 15, BIOS ROM (Basic Input/Output System Read Only Memory) 16, first recording medium 17, and a connection section 18 which is connected with second recording medium 25. To be more specific, the information processing apparatus 10 carries a computer system for implementing various forms of functions.

The processor 11 has a computing function, and is connected with the North Bridge 13 via the host bus 19.

The system memory 12 is a memory for storing the program to be executed by the processor 11 and a working memory when the processor 11 executes the program, or a volatile memory commonly used for the storage of image data. It is connected with the North Bridge 13 via the memory interface 20.

The North Bridge 13 includes a host-PCI bridge for connection between a host bus 19 and PCI (Peripheral Component Interconnect) bus 21, a remote controller for controlling access to the system memory 12, and a cache controller for controlling access to the cache memory (not illustrated).

The South Bridge 14 is connected with the North Bridge 13 via the PCI bus 21, and includes a PCI-LPC bridge for connection between the PCI bus 21 and LPC (Low Pin-Count) bus 22, a PCI-IDE bridge for connection between the PCI bus 21 and IDE (Integrated Drive Electronics) bus 23, a PCI-USB bridge for connection between the PCI bus 21 and USB bus 24, an LPC controller, an IDE controller, a USB controller, and an interrupt controller that determines the request for interrupt from the peripheral devices according to the priority, transmits that information to the processor 11, and generates the interrupt request signal.

The Super I/O 15 contains a basic I/O such as a mouse controller, keyboard controller, flexible disk cartridge drive controller and serial/parallel board, and is connected with the South Bridge 14 via the LPC bus 22.

The BIOS ROM 16 is a ROM incorporating the BIOS as a program group for controlling the peripheral devices (not illustrated) connected to the information processing apparatus 10, such as a disk drive, keyboard and video card. It is made up of a rewritable EPROM (Erasable Programmable Read Only Memory), for example. The BIOS supplies the OS and various forms of programs (application software) with the basic input/output functions for the peripheral devices connected to the information processing apparatus 10.

The BIOS is used to set the date and time, to set the peripheral devices including a disk drive, device and video card and to set the priority of the booting drives. The priority of the booting drives is determined in such a way that the second recording medium 25 is assigned with the top priority in the initial phase, and the first recording medium 17 is assigned with the second top priority in the initial phase. The BIOS setup menu is not released to the general user for the purpose of ensuring the security of the information processing apparatus 10. It is released only when the principal has been authenticated by using the keyboard to input the specific ID and password, for example. It is then displayed on the menu screen.

The first recording medium 17 is made of the Compact Flash (CF) as one type of rewritable flash memory, and is mounted inside the information processing apparatus 10 through the connection section (CF slot) (not illustrated) so that they cannot be removed at all or cannot be easily removed. It is connected with the South Bridge 14 through the connection section thereof via the IDE bus 23. Further, the first recording medium 17 incorporates the OS for controlling the operations of the information processing apparatus 10 and the first program running on this OS.

The connection section 18 is made of a USB slot and is connected with the South Bridge 14 via the USB bus 24.

The second recording medium 25 is composed of a USB memory, and can be connected or disconnected (detachable) from the connection section 18 from the outside of the information processing apparatus 10. This second recording medium 25 incorporates a specific Unlock key file storing the specific Unlock key (authentication information), OS, and second program.

The specific Unlock key is a password/authentication code set by the user or inherent to the apparatus. For example, "xyz20060925" or a desired code can be selected. Further, the second program stored in the second recording medium 25 includes the diagnostic tool and the log collection software of the information processing apparatus 10 used on the market, and the program for automatically updating the program stored in the first recording medium 17. The second program runs on the OS stored in the second recording medium 25.

Figure 2:
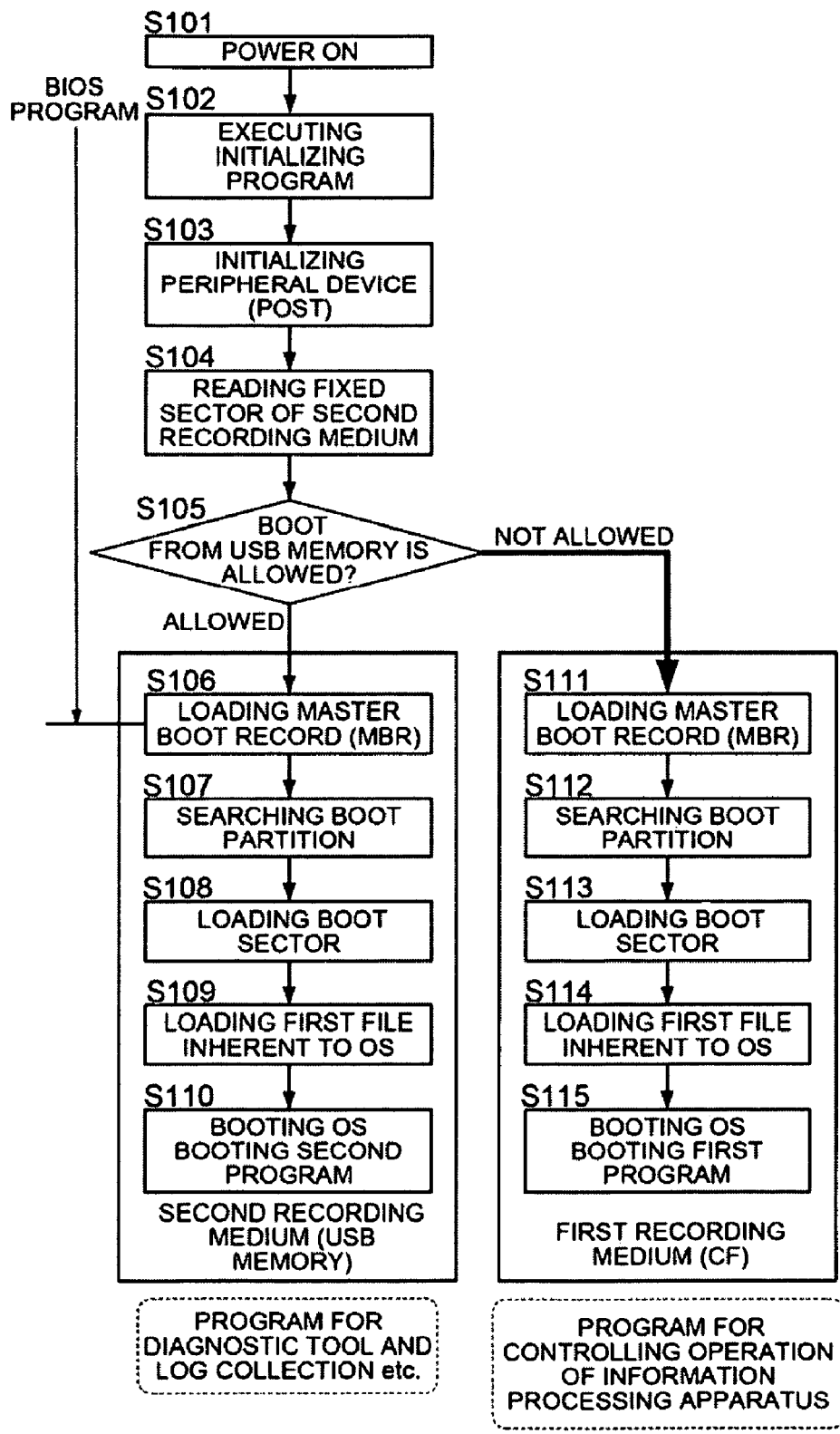
FIG. 2 is a flow diagram representing the operation at the time of booting the information processing apparatus as a first embodiment of the present invention.

The following describes the operation at the time of booting (boot-up processing) of the information processing apparatus 10 of the aforementioned structure:

FIG. 2 shows the flow of processing at the time of booting the information processing apparatus 10 (power-on operation).

For example, when the service personnel maintains information processing apparatus 10, the information processing apparatus 10 is booted up by connecting the connection section 18 of the information processing apparatus 10 with the second recording medium 25 storing the aforementioned specific Unlock key file, OS, and the second program {the diagnostic tool and log collection software of the information processing apparatus 10 on the market, the program for automatically updating the program stored in the first recording medium 17, and the program for supplying the function of customizing for each OEM (Original Equipment Manufacturer) or user (e.g., customization of displaying only the required input/output mode)}.

If the service personnel has turned on the information processing apparatus 10 (Step S101) when the connection section 18 is connected with the second recording medium 25, as shown in FIG. 2, the initializing program in the BIOS program stored in the BIOS ROM 16 is called out and is executed (Step S102), thereby the initialization of the peripheral device (POST) such as initialization of the video card, checking of the memory and initialization of the device (step S103).

Upon completion of initialization of the peripheral device, the fixed sector incorporating the specific Unlock key file of the second recording medium 25 is read, whereby specific Unlock key (e.g., "xyz20060925") is acquired (Step S104). Then a step is taken to determine whether booting from the second recording medium 25 is allowed or not (USB memory) (Step S105).

When the specific Unlock key has been authenticated and booting from the second recording medium 25 has been allowed (Step S105; Allowed), the master boot record (MBR) of the second recording medium 25 is loaded on the system memory 12, and control is transferred to the boot program written therein (Step S106).

The boot program searches the boot partition in the second recording medium 25 (Step S107), and finds out the leading edge of the boot partition from the partition table. Then the boot sector is loaded in the system memory 12 (Step S108).

The program recorded in the boot sector loads the OS loader in the system memory 12, and transfers the control to the OS of the second recording medium 25 (Step S109). The OS of the second recording medium 25 boots the second program, namely, the diagnostic tool and log collection software of the information processing apparatus 10 on the market, and the program for automatically updating the program stored in the first recording medium 17 (Step S110).

This procedure allows the service personnel to execute the self-diagnosis and log collection of the information processing apparatus 10, and automatic updating of the program stored in the first recording medium 17.

While, if the information processing apparatus 10 is booted when the connection section 18: of the information processing apparatus 10 is connected: to the second recording medium 25 wherein there is no specific Unlock key file or there is an non-specific Unlock key file incorporating the non-specified Unlock key different from the specific Unlock key, for example, the specific Unlock key cannot be authenticated and booting from the second recording medium 25 is not allowed. If booting from the second recording medium 25 is not allowed (step S105; Not allowed), booting starts from the first recording medium 17.

The first recording medium 17 is mounted inside the information processing apparatus 10 so that it cannot be removed by the user. Further, the BIOS setup menu is not released to the user. Thus, the user cannot access the program stored in the first recording medium 17. As described above, the first recording medium 17 is provided with security. Accordingly, there is no problem without authentication of the first recording medium 17. Thus, at the time of booing from the first recording medium 17, processing goes on without the first recording medium 17 being authenticated.

When booting starts from the first recording medium 17, the master boot record (MBR) of the first recording medium 17 is loaded in the system memory 12 and the control is transferred to the boot program written therein (Step S111).

The boot program searches the boot partition in the first recording medium 17 (Step S112), and finds out the leading position of the boot partition from the partition table. Then the boot sector is loaded in the system memory 12 (Step S113).

The program recorded in the boot sector loads the OS loader in the system memory 12, and transfers the control to the OS of the first recording medium 17 (Step S114). The OS of the first recording medium 17 boots up the first program for controlling the operation of the information processing apparatus 10 (Step S115). In the information processing apparatus 10 structured as a digital multifunction peripheral as in the present embodiment, it is possible to: perform the operations of copying function, scanner function, printer function, facsimile function and others.

Further, when power of the information processing apparatus 10 has been turned on without the second recording medium 25 being connected, the second recording medium 25 assigned with the top priority for the booting drive according to the BIOS setting cannot be detected. Accordingly, booting starts from the first recording medium 17 which is assigned with the second top priority. To be more specific, the information processing apparatus 10 is booted according to the flow described with reference to the conventional boot-up processing.

In the information processing apparatus 10 of the present invention, processing of authentication is applied to the second recording medium 25 (USB memory) connected to the connection section 18 from the outside to verify if the specific Unlock key can be acquired or not. This procedure allows booting from only the program (specific program) stored together with the specific Unlock key in the second recording medium 25. Booting from other programs (non-specific program) is not allowed. This procedure eliminates the possibility of booting the non-specific program stored in the second recording medium 25, and accessing the program in the information processing apparatus 10 by using the non-specific program. Thus, on the BIOS level, the booting drive can be switched over to the second recording medium 25 (USB memory) as an external device while the security of the information processing apparatus 10 is ensured.

Further, without having to perform the operation of changing the priority of the booting drive on the BIOS setup menu, the booting drive can be switched over to the second recording medium 25 during BIOS boot-up operation. The program stored in the second recording medium 25 is booted on the BIOS level (booted independently of the OS mounted on the information processing apparatus 10). This provides the program of a high degree of freedom independently of the OS on the apparatus side.

To be more specific, when the boot-up booting drive is switched over the second recording medium 25 as ant external device during BIOS, the program (the second program) of the second recording medium 25 can use the unique OS stored in the second recording medium 25, and a special program without OS, whereby the degree of freedom of the program is enhanced. Further, since there is no dependence on the OS of the apparatus or the program (the first program), there is no need of changing the OS on the apparatus side in conformity to the program of the second recording medium 25. A mere change of the program loaded in the second recording medium 25 is sufficient, and the program to be loaded in the second recording medium 25 can be easily changed at any place if a personal computer is available.

When booting from the first recording medium 17 (Compact Flash) provided inside the information processing apparatus 10, there is no need of authenticating the first recording medium 17, and this simplifies boot-up processing.

Embodiment 2

The second recording medium 25 (external recording medium) storing the diagnostic tool or the like of the information processing apparatus 10 is normally supplied to the service field by the manufacturer of the apparatus. In the first embodiment, the second recording medium 25 is authenticated only by the comparison of the contents of the authentication information file (specific Unlock key file) inside the recording medium. Accordingly, if the second recording medium 25 of the genuine product (regular product) incorporating the regular authentication information (specific Unlock key) and program is illegally copied in the service field, the program (diagnostic tool) illegally copied by authentication may be booted by this copied product. When the personal information can be operated by the diagnostic tool, there is a security problem. When updating is available on a paid basis, a loss will arise if the program of the apparatus outside the scope of management is illegally updated by the copied external recording medium. Generally, copying and illegal use of the external recording medium incorporating the data or program is problematic. Some action must be taken to avoid this.

With reference to the second through sixth embodiments, the following describes the technique wherein the genuineness of the second recording medium 25 externally connected to the information processing, apparatus is evaluated, and authentication is granted or denied, whereby illegal use of the copied second recording medium 25 (the second program) is avoided. The information processing apparatus of the second embodiment has the same structure as that of the first embodiment, except that the apparatus of the second embodiment has the function of evaluating the genuineness of the second recording medium 25 and granting or denying authentication (control program of processor 11). Accordingly, details of the structure will be omitted in the following description.

As described with reference to the first embodiment, the specific Unlock key as authentication information is stored in the specific Unlock key file (authentication information file). Together with the OS and the second program, it is stored in the second recording medium 25. Generally, the file contains the storage data as well as the information representing the attributes such as the type and capacity (size) of the file, created date, updated date, and access date (commonly called the file attributes). The file attributes are generated as a result of generation of the file, and are rewritten by the change of the file or operation applied to the file.

For example, the "created date" in the file attribute denotes the date of its creation (M1) in a newly created file. In the file formed by copying this file, it denotes the copy date (M2). To be more specific, the created date in the file attribute is the information that changes between the copy source and copy destination when the file is copied (M1≠M2). The distinction between the genuine file and copy file can be made by utilizing the information that changes between the copy source and copy destination (information denoting the created date of the file) when the file is copied, and the information that is copied without being changed from the copy source to the copy destination, whereby the genuineness of the file can be determined.

The following describes two methods for determining the genuineness of the file by utilizing the information that is changed or not changed by copying of the file.

(File Genuineness Determining Method 1)

The "updated date" in the file attribute indicates the date wherein the file is updated. When a new file is created on the personal computer, the file is not yet updated (stored data changed) at the time of creating the file, as a matter of course. Thus, the updated date agrees with the created date of the file. Further, when a new file is directly created in the external recording medium connected to the personal computer, the updated date (R1) is almost the same as the created date (M1) although there is a slight delay (about 1 through 2 seconds) (M1≈R1). In the copy file, the file is not updated at the time of copying. Accordingly, the updated date (R2) at the copy destination is equal to the updated date (R1) of the copy source (R1=R2).

As described above, the "updated date" in the file attribute is the information which is copied without any change between the copy source and the copy destination when the file is copied. The genuineness of the file is determined by comparison between this "updated date" and "created date".

Figure 3:
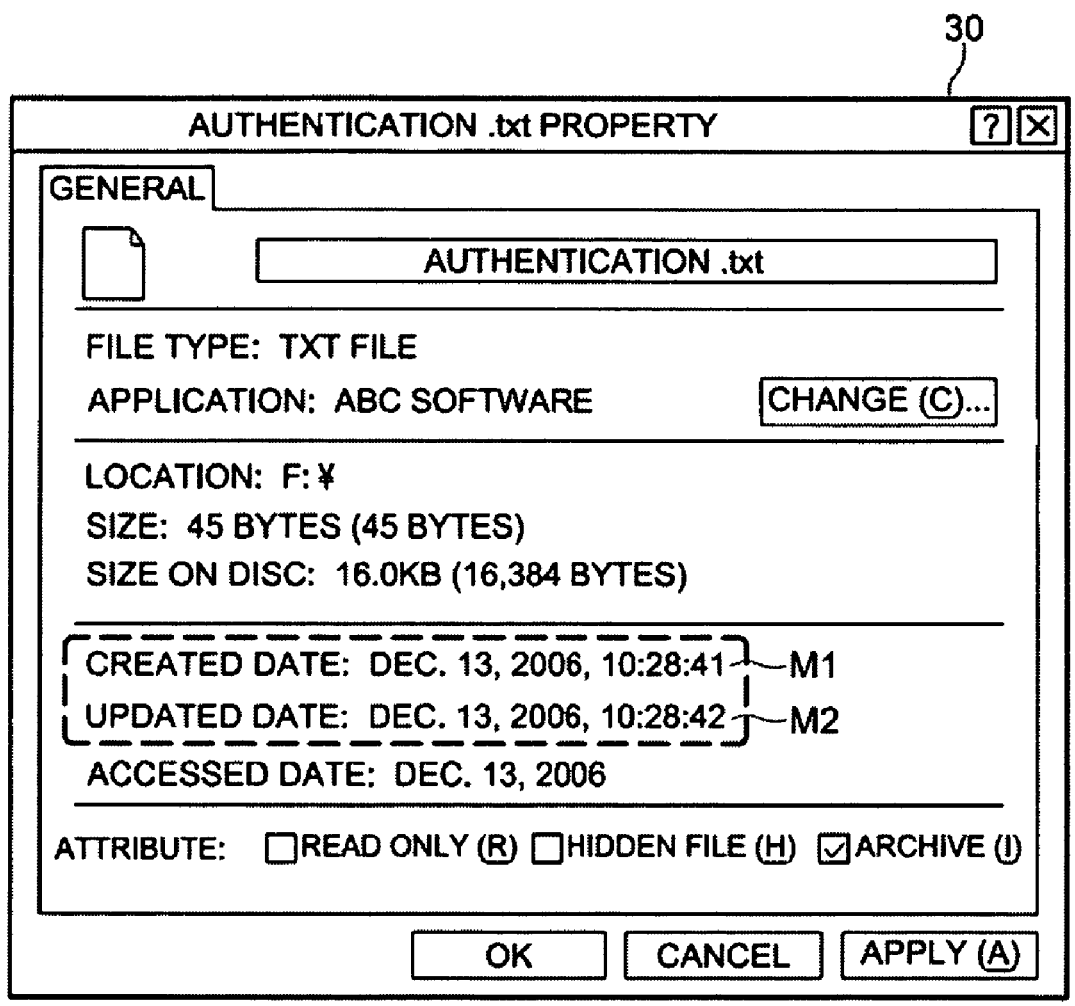
FIG. 3 is a diagram representing the property window of a newly created authentication information file.
Figure 4:
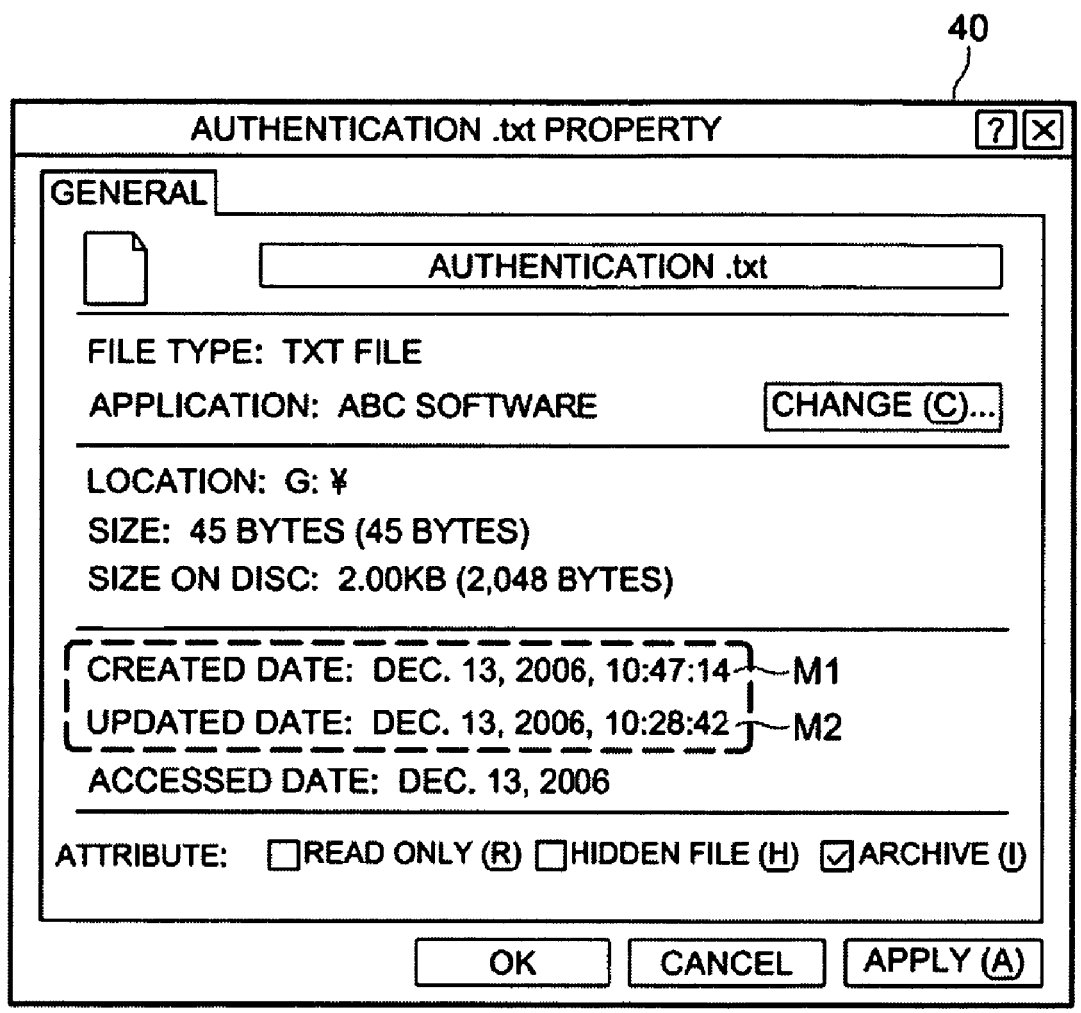
FIG. 4 is a diagram representing the property window of a copied authentication information file.

FIG. 3 and FIG. 4 show the property windows of the authentication information file (authentication.txt) displayed on the display screen of the personal computer or the like. Generally, the file property window shows the attribute information such as the created date and updated date of the file.

For examples in the authentication information file newly created inside the external recording medium connected to the personal computer, the created date M1 is almost the same as the updated date R1, as shown in the property window 30 of the FIG. 3. In the example of FIG. 3, the authentication information file was created at 10:28:41 on Dec. 13, 2006. The updated date R1 is almost the same as the created date M1 although there is a delay of one second (M1≈R1).

In the authentication information file formed by copying this authentication information file to another external recording medium, there is an increased difference between the created date M2 and updated date R2, as shown in the property window of FIG. 4. In the example of FIG. 4, the authentication information file was copied at 10:47:14 on Dec. 13, 2006. Here the updated date R2 is the same as the updated date R1 of the original authentication information file (R1=R2), and the created date M2 is changed to the date when copying operation was performed (M1≠M2 (M1<M2).

As described above, in the authentication information file newly created inside the external recording medium, the created date of the file attribute and the updated date is almost the same with each other, wherein the delay is kept within the range of several seconds. In the authentication information file copied in the external recording medium, there is a big difference between the created date of the file attribute and the updated date (the difference between the actual created date and copy date). This is used to verify the difference (deviation) between the created date of the file attribute and updated date, whereby the genuine file can be distinguished from the copy file and the genuineness of the file can be identified.

Further, even when a: regular authentication information file is newly created on a personal computer and is copied into the external recording medium, the difference between the created data of the file attribute and updated date can be reduced according to the following procedure:

For example, when the authentication information file is created on the personal computer and is copied into the external recording medium without being updated, in the authentication information file inside the external recording medium, the updated date of the file attribute indicates the actual created date on the personal computer, and the created date of the file attribute indicates the copy date into the external recording medium. Thus, the authentication information file newly created on the personal computer is copied into the external recording medium within a predetermined time period (e.g., within several seconds through several tens of seconds), whereby the difference between the created data of the file attribute and the updated date can be set within a predetermined time period.

Further, when the authentication information file created on the personal computer is updated and is copied into the external recording medium, the updated date of the file attribute indicates the updated date on the personal computer. Accordingly, if the authentication information file updated on the personal computer is copied to the external recording medium within a predetermined time (e.g. within several seconds to several tens of seconds) subsequent to updating, the difference between the created data of the file attribute and the updated date can be set with a predetermined time. Further, the authentication information file copied into the external recording medium is updated inside the external recording medium within a predetermined time (e.g. within several seconds to several tens of seconds) subsequent to copying, whereby the difference between the created data of the file attribute and the updated date can be set within a predetermined time, in the similar manner.

As described above, if the difference between the created date of the file attribute and the updated date is set within a predetermined time, the authentication information file stored in the regular external recording medium (the second recording medium 25) can be easily distinguished from the authentication information file inside the external recording medium having been copied in the service field or the like, namely, the copy file containing a dig difference between the created data of the file attribute and updated date (e.g., difference in terms of days).

(File Genuineness Determining Method 2)

In the file genuineness determining method 1, the updated date of the file attribute automatically generated at the time of creating a file is utilized as the information copied without being changed at the time of file copying for the purpose of comparison with the information that is changed at the time of file copying. Such information without being changed at the time of file copying can be created by the person having created the file and can be contained in the file. The following describes this procedure:

For example, an authentication information file is newly created in the external recording medium connected to the personal computer. The creator of the file opens the property window of the authentication information file and verifies the created date in the file attribute. In addition to the authentication information (specific Unlock key), the information showing the crated data having been verified is described into the data stored in the authentication information file and is stored therein.

For example, in the authentication information file newly created in the external recording medium connected to the personal computer, "10:28:41, Dec. 13, 2006" is indicated as the created date (M1), as shown in the property window 30 of FIG. 3. In this case, the information (N1) showing the date is de scribed in the data to be stored in the authentication information file and is stored therein. This arrangement provides agreement between the created date (N1) described in the authentication information file and the created date (M1) in the file attribute of the authentication information file (N1=M1).

If this authentication information file is copied into another external recording medium to crate a copy file, data is directly copied into the copy file from the original file. Accordingly, the information representing the created data of the file described in the data is copied without changing from the copy source to the copy destination (created date described in the copy file: N1). In the case of a copy file, as has been described with reference to "(File genuineness determining method 1), the created date in the file attribute is changed into the copy date (copy date: M2 (M1≠M2)). Thus, there is no agreement between the created date (N1) described in the copy file and the created date (M2) in the file attribute of the copy file (N1≠M2).

In the aforementioned procedure, an authentication information file is created in the regular external recording medium, whereby comparison is made between the created date described in the authentication information file and the created date in the file attribute of the authentication information file. If agreement is found out, the file is genuine. If not, the file is a copy file. As described above, this arrangement ensures easy distinction between the genuine file and copy file, whereby the file genuineness can be determined.

Figure 5:
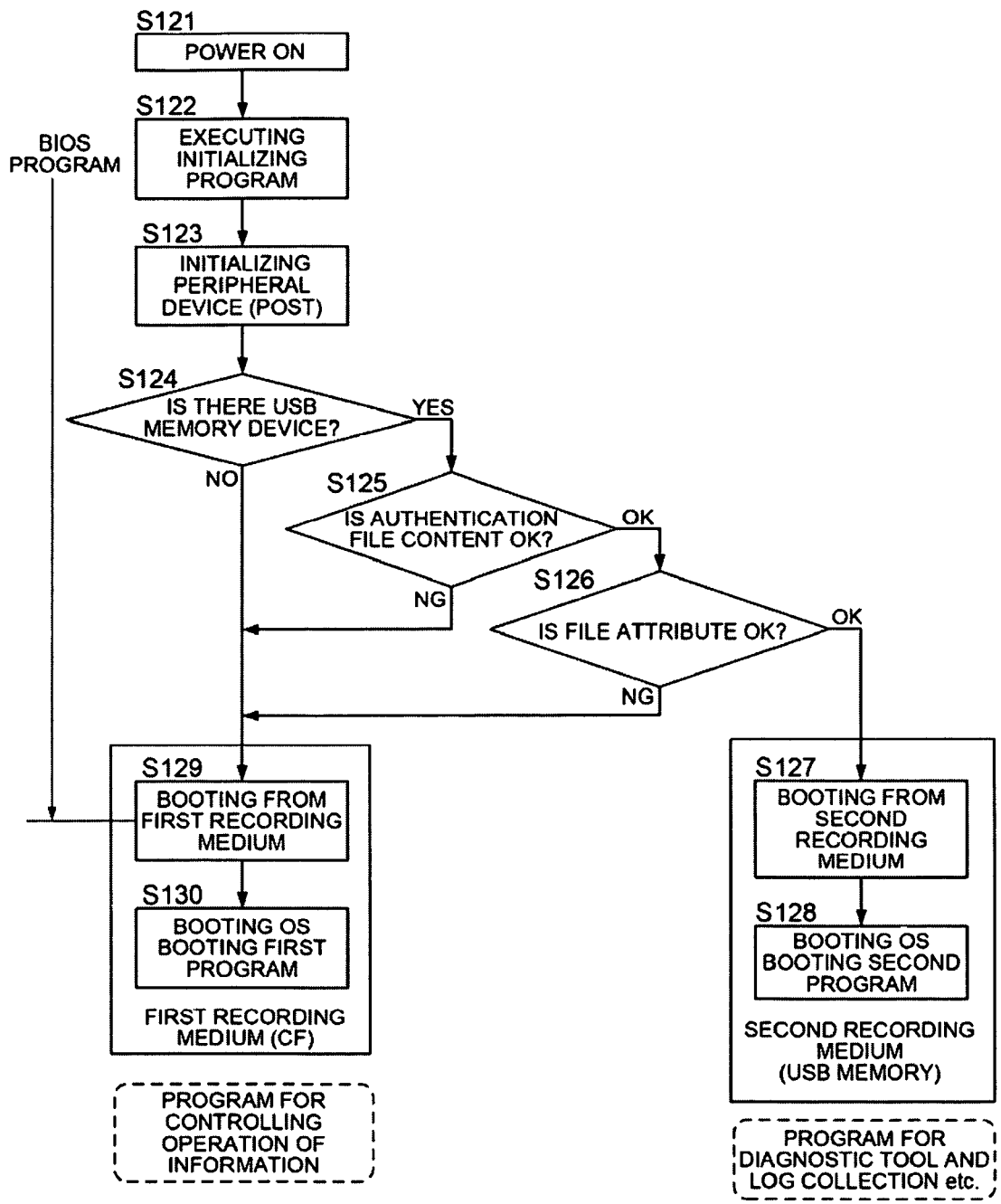
FIG. 5 is a flow diagram representing the operation at the time of booting the information processing apparatus as a second embodiment of the present invention.

The following describes the operation at the time of booting (boot-up processing), using the genuineness determining methods 1 and 2 for the file by the information processing apparatus 10 as a second embodiment FIG. 5 shows the flow representing the processing at the time of booting the information processing apparatus ID as a second embodiment. Steps S121 through S123 of FIG. 5 indicate the same processing as that of the Steps S101 through S103 of FIG. 2 described with reference to the first embodiment.

In Step S124, a step is taken to determine whether the second recording medium 25 (USB memory) is connected to the connection section 18 (FIG. 1) or not.

If the second recording medium 25 is connected (Step S124; YES), the contents of the specific Unlock key file (authentication information file) are verified to determine authentication (Step S125). To put it in greater details, the fixed sector incorporating the specific Unlock key file of the second recording medium 25 is read to acquire the specific Unlock key, and a decision is made to see whether or not booting of the second recording medium 25 is allowed.

If the contents of the specific Unlock key file have been determined as correct (if the specific Unlock key has been authenticated) (Step S125; OK), the genuineness of the specific Unlock key file is determined according to the file genuineness determining method 1 or 2 (Step S126). To be more specific, the specific Unlock key file identifies the genuine file from the copy file. When the genuineness determining method 1 is used, the difference between the created date and updated date is identified in the file attribute of the specific Unlock key file, and a decision is made to see whether or not the difference remains within a specified level (e.g. within 3 seconds or not). If the genuineness determining method 2 is used, the created date described in the specific Unlock key file and the created data of the file attribute of the specific Unlock key file are checked to determine whether or not they agree with each other.

If the decision is affirmative (Step S126; OK), the second recording medium 25 currently connected to the information processing apparatus 10 is determined as genuine, and the boot-up operation starts from the second recording medium 25 (Step S127). The boot-up processing from the second recording medium 25 is the same as that in Step S106 to Step S109 of FIG. 2. The OS of the second recording medium 25 boots up the second program (e.g., diagnostic tool of the information processing apparatus 10) (Step S128).

If it has been determined in Step S124 that the second recording medium 25 is not connected (Step S124; No), or it has been determined in Step S125 that the contents of the authentication information file are incorrect (specific Unlock key not allowed) (Step S125; NG), the boot-up operation starts from the first recording medium 17 (Step S129). If the decision is negative in Step S126 (Step S126; NG), the second recording medium 25 currently connected to the information processing apparatus 10 is determined as a copy product and the boot-up operation starts from the first recording medium 17 in this case as well (Step S129). The boot-up processing from the first recording medium 17 is the same as that from Step S111 to Step S114 of FIG. 2. The OS of the first recording medium 1 boots up the first program (the program for controlling the operation of the information processing apparatus 10) (Step S130).

As described above, in the second embodiment, the genuineness of the second recording medium 25 externally connected to the information processing apparatus 10 can be determined. In the authentication of the second recording medium 25, only the genuine product is authenticated and the products (including copy products) other than the genuine one are not authenticated. Booting of the second copied program can be prevented. For example, even when personal information can be operated by the diagnostic tool, security can be ensured. When the updating is on a paid basis, this arrangement avoids illegal updating of the program of the apparatus not placed under management by the copied external recording medium, whereby a possible loss can be eliminate.

Embodiment 3

In the second embodiment, the genuineness of the second recording medium 25 is determined by the file attribute. In the third embodiments it is determined by an improved version of the specific Unlock key stored in the second recording medium 25. The information processing apparatus of the third embodiment has the same structure as that of the first embodiment except for the function (program to control the processor 11) for determining the genuineness of the second recording medium 25, and details of the structure will not be described to avoid duplication.

In the third embodiment, when the OS and the second program are stored in the second recording medium 25, a specific Unlock key is generated from the information inherent to the medium of the second recording medium 25 using the specific function. This specific Unlock key is stored in the authentication information file, which is then stored in the second recording medium 25. The information processing apparatus 10 has the function that checks whether or not there is agreement between the result of the information inherent to the medium held by the second recording medium 25 being computed by the specific function, and the specific Unlock key of the authentication information file stored in the second recording medium 25, according to the decision (authentication) of the genuineness of the second connected second recording medium 25; and if there is agreement, the product is determined as genuine (authenticated) whereas, if not, it is determined as non-genuine (not authenticated), whereby the program boot control is implemented.

For example, assume that the information inherent to medium is the serial number of the second recording medium 25, and the specific function is the sum of the digits of the serial number. Under this condition, a specific Unlock key is generated in advance, is described in the authentication information file, and is then stored in the second recording medium 25. It should be noted that the storage location of the authentication information file can be found on the normal file system.

The information processing apparatus 10 reads the serial number stored by the second recording medium 25 being connected, and checks if there is agreement between the sum of the digits of the serial number thereof, and the specific Unlock key of the authentication information file stored in the second recording medium 25, whereby the genuineness is evaluated (authenticated or not).

Figure 6:
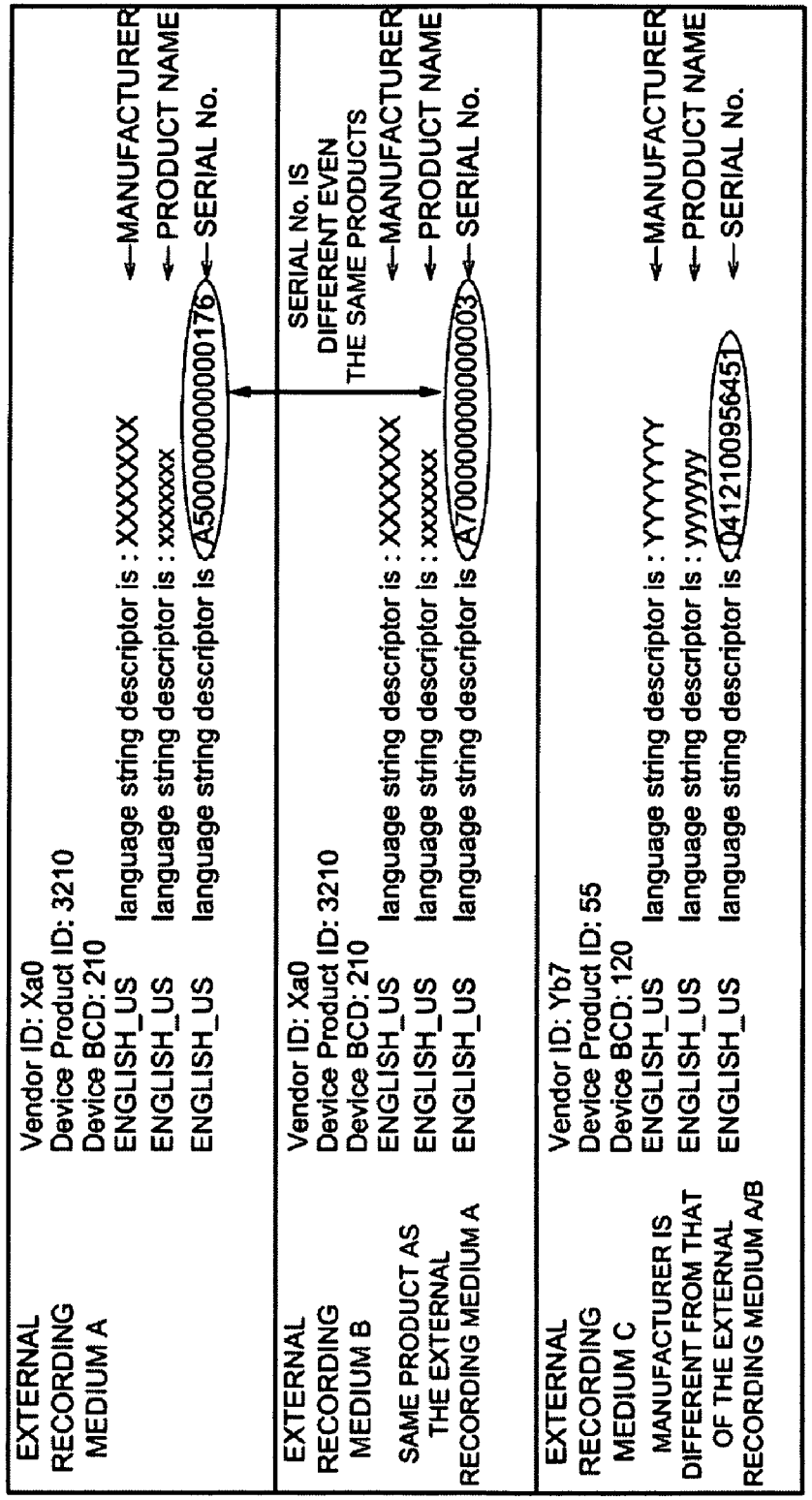
FIG. 6 is a diagram representing an example of the information inherent to the medium stored by an external recording medium.

FIG. 6 is a diagram representing an example of the information inherent to the medium stored by an external recording medium. FIG. 6 shows the comparison of each piece of information inherent to medium (e.g., manufacturer's name, product name and serial number) stored in the three external recording media A, B and C. The external recording medium A and external recording medium B are the same products, while external recording media A/B and external recording medium C are different products manufactured by different manufacturers.

In the external recording medium such as a USB memory, information inherent to medium is generally embedded in the descriptor of the external recording medium by the manufacturer. The descriptor is a special area such as a master boot record, and can be viewed only by a special program in the general purpose OS (it cannot be viewed as a file without special program).

As shown in FIG. 6, the external recording medium A and external recording medium B as the same products have the same manufacturer name and same product name, but have different serial numbers. Further, the external recording media A/B and external recording medium C as different products have different manufacturer names and product names as well as different formats of the serial numbers (the number of digits).

The following specific Unlock keys are generated using the sum obtained by adding digits of serial numbers in these external recording media A, B and C:

Specific Unlock key of external recording medium A: 19 (=5+1+7+6)

Specific Unlock key of external recording medium B: 10 (=7+3)

Specific Unlock key of external recording medium C: 38 (=4+1+2+1+9+5+6+4+5+1)

As described above, specific Unlock keys are generated from the serial numbers different for each external recording medium using a specific function. This procedure generates specific Unlock keys which are not easily overlapped among the same or different products. Further, encryption using a specific function provides specific Unlock keys which cannot be easily decoded.

In the second genuine recording medium 25 storing such a specific Unlock key, there is agreement between the sum of the digits of the inherent serial numbers stored in the second recording medium 25, and the specific Unlock key. Further, in the copied external recording medium, there is no agreement between the sum of the digits of the inherent serial numbers stored in that external recording medium 25, and the specific Unlock key stored in the authentication information file having been copied.

The following describes the operation at the time of booting by the information processing apparatus 10 as the third embodiment.

Figure 8:
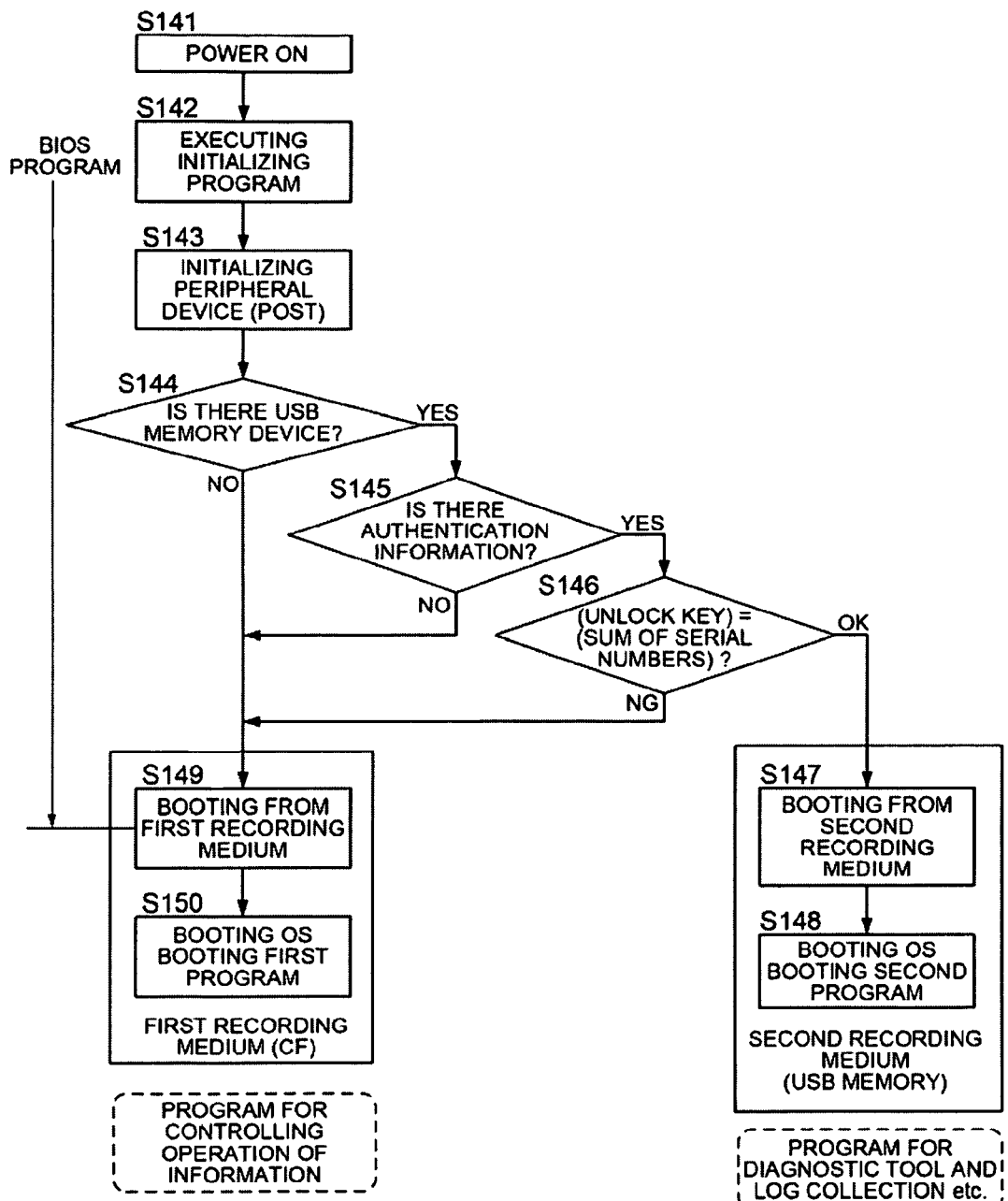
FIG. 8 is a flow diagram representing the operation at the time of booting the information processing apparatus as a third embodiment of the present invention.

FIG. 7 shows the comparison of program boot control when the information processing apparatus 10 is connected with the second genuine recording medium 25 or third recording medium 45 formed by copying the second recording medium 25, and the apparatus is booted. FIG. 8 is a flow representing the operation at the time of booting the information processing apparatus.

Processing in the Step S141 through S144 of FIG. 8 is the same as that in Step S121 through S124 of FIG. 5, described with reference to the second embodiment When the information processing apparatus 10 is connected with the external recording, medium (USB memory) (Step S144; Yes), a decision is made to see whether the authentication information (specific Unlock key) is present or not in the external recording medium. When the second genuine recording medium 25 or third copied recording medium 45 is connected, a decision is made on authentication (evaluation of genuineness) using the authentication information, since they both have authentication information files stored in the recording medium (Step S145; Yes). To put it in greater details, the serial number is obtained from the information inherent to medium embedded into the descriptor of the recording medium. Then a decision is made to see whether or not there is agreement between the sum obtained by adding digits of serial numbers (specific function at the time of generating the specific Unlock key) and the specific Unlock key contained in the authentication information file inside the recording medium (Step S146).

When there is agreement between this sum and specific Unlock key (Step S146; OK), a decision step is taken to determine that the recording medium currently connected to the information processing apparatus 10 is the second genuine recording medium 25. As shown in FIG. 7 (A), authentication is granted (authentication OK). The boot-up operation starts from the second recording medium 25 (Step S147), and the second program is booted up by the OS of the second recording medium 25 (step S148).

If it has been determined in Step S144 that the recording medium is not connected (Step S144; No), or it has been determined in Step S145 that authentication information is not contained in the recording medium (Step S145; No), the boot-up operation starts from the first recording medium 17 (Step S149), the first program is booted by the OS of the first recording medium 17 (Step S150). If there is agreement between the sum and the specific Unlock key in Step S146 (Step S146; NG), a decision is made on the recording medium third copied recording medium 45 currently connected to the information processing apparatus 10, and authentication is not granted, as shown in FIG. 7(B) (authentication NG). The boot-up operation starts from the first recording medium 17 in this case as well (Step S149), and the first program is booted by the OS of the first recording medium 17 (Step S150).

As described above, in the third embodiment wherein genuineness is determined using the specific Unlock key generated by the specific function from the information inherent to medium, the genuineness of the second recording medium 25 connected to the information processing apparatus 10 can be determined as well. This arrangement ensures that only the genuine product is authenticated and the products (including copy products) other than the genuine one are not authenticated. Thus, the same advantages as those of the second embodiment are obtained.

Embodiment 4

In the fourth embodiment, the following describes the authentication information generation apparatus for generating the authentication information (specific Unlock key) from the information inherent to medium described with reference to the third embodiment using the specific function.

Figure 9:
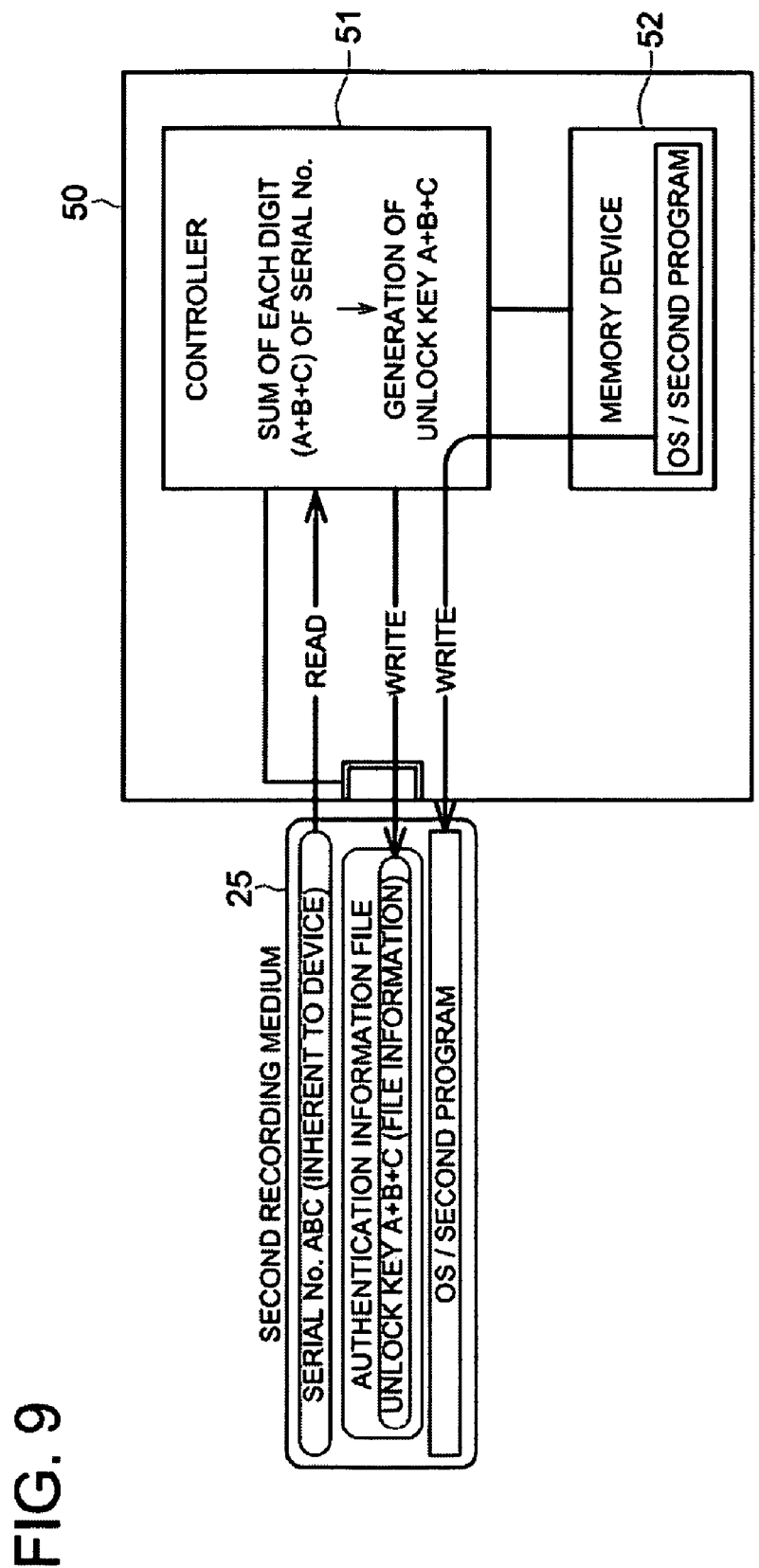
FIG. 9 is a diagram representing the major components of the recording medium manufacturing apparatus as a fourth embodiment of the present invention.

FIG. 9 represents the major components of the authentication information generation apparatus 50 as a fourth embodiment. The authentication information generation apparatus 50 is made up of a general personal computer and others, and is provided with a controller 51, memory device 52 and connection section 53, as illustrated.

The controller 51 has a computing function as well as a function for centralized control of the entire apparatus. The memory device 52 stores various forms of programs and data including the OS and the second program loaded, in the second recording medium 25. The connection section 53 is made of the USB slot connected with the external recording medium (USB memory) containing the second recording medium 25.

The following describes the operations of the authentication information generation apparatus 50.

Figure 10:
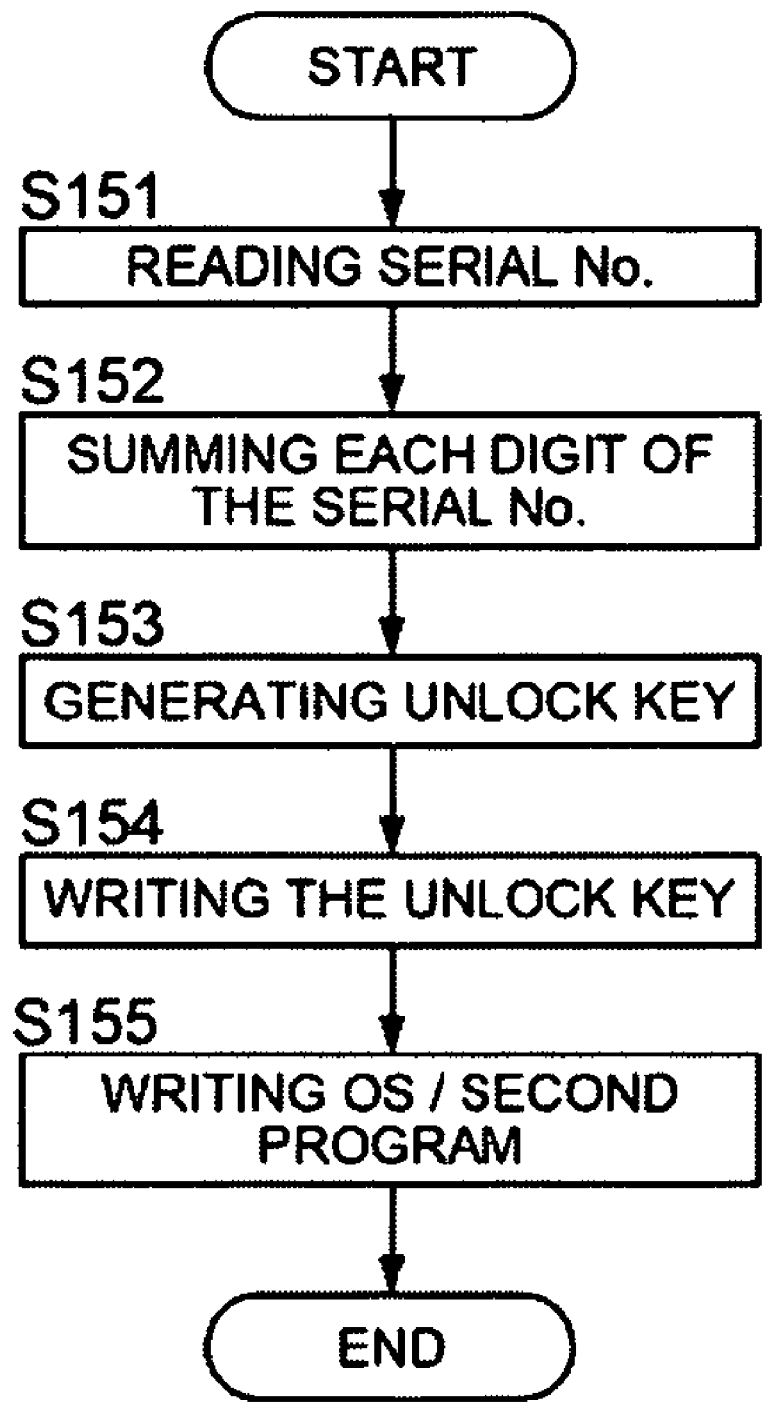
FIG. 10 is a flow diagram representing the operation of the recording medium manufacturing apparatus as a fourth embodiment of the present invention.

FIG. 10 is a flow showing the processes for generating the authentication information by the authentication information generation apparatus 50, and storing into the second recording medium 25.

The controller 51 of the authentication information generation apparatus 50 reads the serial number from the second recording medium 25 connected to the connection section 53 (Step S151), and a specific Unlock key (authentication information) is generated (Step S153), using the sum obtained by adding digits of serial numbers having been read (Step S152). The generated specific Unlock key is stored in the authentication information file and is written into the original the second recording medium 25 (Step. S154). Further, the controller 51 reads the OS and the second program from the memory device 52, and writes them into the second recording medium 25 (Step S155).

This authentication information generation apparatus 50 can generate the authentication information capable of determining the genuineness of the second recording medium 25 from the serial number stored in the second recording medium 25 using the specific function. Further, the second recording medium 25 containing the authentication information capable of determining the genuineness can also be created.

Embodiment 5

In the third and fourth embodiments, the authentication information used to determine the genuineness of the second recording medium 25 is generated from the information inherent to medium. In the fifth embodiment, it is generated from the file attribute (created date) of the authentication information file stored in the second recording medium 25. It should be noted that the information processing apparatus of the fifth embodiment has the same structure as that of the first embodiment, except for the function (a program for controlling the processor 11) for determining the genuineness of the second recording medium 25. Accordingly, detailed description of the structure will be omitted avoid duplication.

In the fifth embodiment, the authentication information file is created in the second recording medium 25, and a specific Unlock key is generated from the created date in the file attribute of the authentication information file using the specific function. This specific Unlock key is stored in the authentication information file contained in the second recording medium 25. In conformity to the decision on genuineness (decision on authentication) of the second recording medium 25 being connected, the information processing apparatus 10 checks whether or not there is agreement between the result of using the specific function to compute the created date in the file attribute of the authentication information file stored in the second recording medium 25, and the specific Unlock key of the authentication information file incorporated in the second recording medium 25. If there is agreement, the product is determined as genuine (authenticated) whereas, if not, it is determined as non-genuine (not authenticated), whereby the program boot control is implemented.

For example, the specific function is assumed as the sum obtained by adding digits of the created date in the file attribute. Under this condition, a specific Unlock key is generated in advance and is stored in the authentication information file contained in the second recording medium 25. It should be noted that the storage location of the authentication information file can be found on the normal file system.

The information processing apparatus 10 reads the created date in the file attribute of the authentication information file stored in the second recording medium 25 being connected, and checks whether or not there is agreement between the sum obtained adding digits of the created date and the specific Unlock key of the authentication information file incorporated in the second recording medium 25, whereby the genuineness is determined (authenticated or not).

As shown in FIG. 3, when the created date in the file attribute of a newly created authentication information file is "10:28:41 on Dec. 13, 2006", the specific Unlock key is generated as follows, using the sum obtained by adding digits of the created date Specific Unlock key: 31 (=2+6+1+2+1+3+1+2+8+4+1)

As shown in FIG. 4, if the created date of the file attribute is "10:28:41 on Dec. 13, 2006" in the file obtained by copying this authentication information file, the sum obtained by adding digits of the created date will be as shown below, and fails to agree with the aforementioned specific Unlock key:

Sum: 32 (=2+6+1+2+1+3+1+4+7+1+4)

Thus, in the second genuine recording medium 25 incorporating the aforementioned specific Unlock key, the sum of the digits of the created date in the file attribute of the authentication information file stored in the second recording medium 25 agrees with the specific Unlock key. In the copied external recording medium, the sum of the digits of the created date in the file attribute of the stored authentication information file (copy file) fails to agree with the specific Unlock key.

The following describes the operation at the time of booting by the information processing apparatus 10 in the fifth embodiment.

Figure 12:
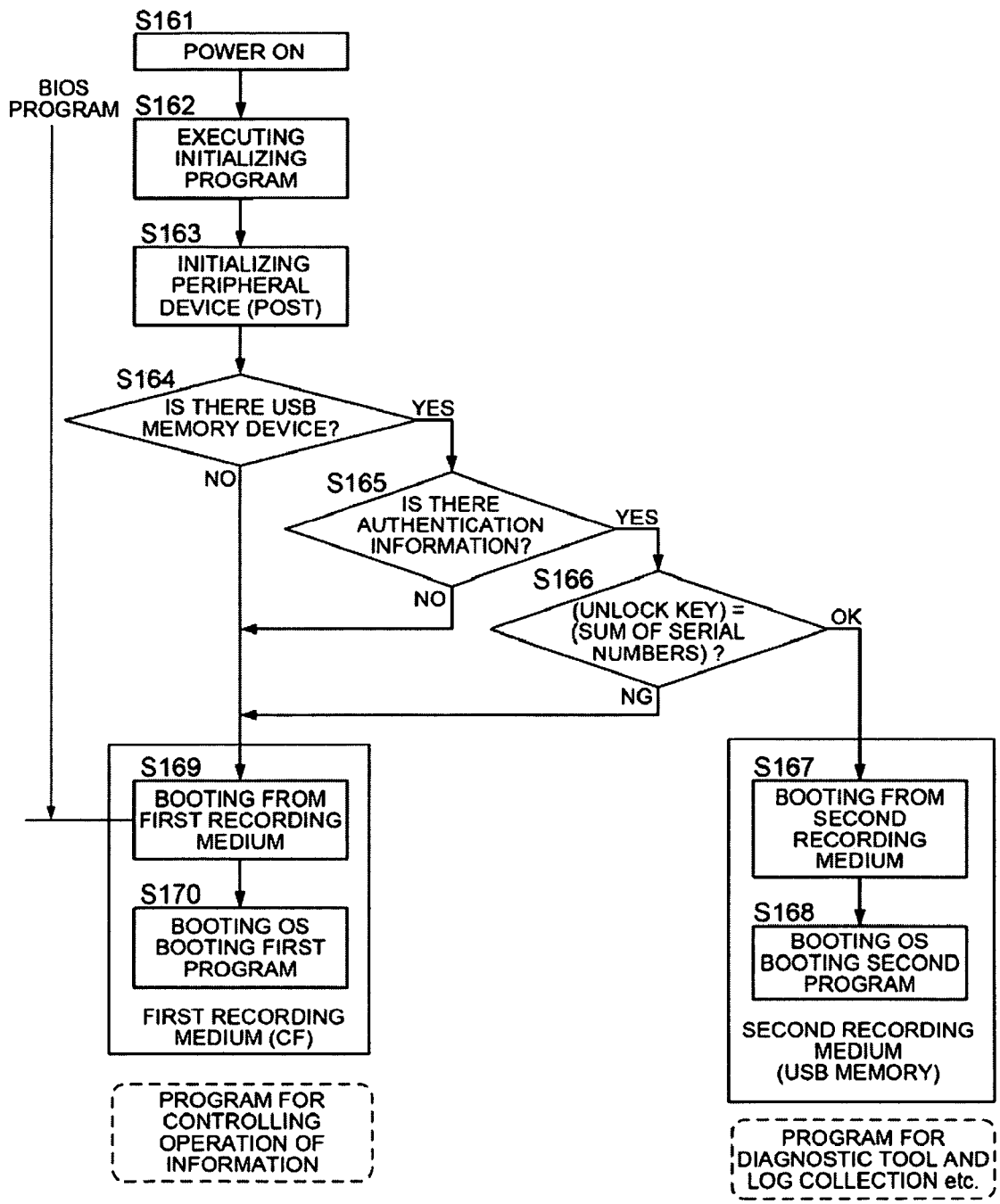
FIG. 12 is a flow diagram representing the operation at the time of booting the information processing apparatus as a fifth embodiment of the present invention.

FIG. 11 is a diagram comparing the boot control of the programs when the apparatus has been booted up as the second genuine recording medium 25 or the third recording medium 55 formed by copying the second recording medium 2 is connected to information processing apparatus 10. FIG. 12 is a flow representing the operation at the time of booting the information processing apparatus 10.

The operations in Steps S161 through S164 of FIG. 12 are the same as those in Steps S121 through S124 of FIG. 5 described with reference to the second embodiment.

When the information processing apparatus 10 is connected with the external recording medium (USB memory) (Step S164; Yes), presence or absence of the authentication information (specific Unlock key) inside the external recording medium is checked. When the second genuine recording medium 25 or third copied recording medium 45 is connected, the authentication information file is contains in the recording medium together with them (step S165; Yes), and therefore, the authentication information is used for authentication (determination, of genuineness). To put it in greater details, the created date of the file attribute is obtained from the authentication information file of the recording medium, and a decision is made to see whether or not there is agreement between the sum of the digits of created date (specific function at the time of generating the specific Unlock key) and the specific Unlock key contained in the authentication information file (Step S166).

If there is agreement between this sum and specific Unlock key (Step S166; OK), the recording medium currently connected to the information processing apparatus 10 is determined as the second genuine recording medium 25, and authentication is granted (authentication OK), as shown in FIG. 11 (A). Then the boot-up operation starts from the second recording medium 25 (Step S167), and the second program is booted by the OS of the second recording medium 25 (Step S168).

If the recording medium is determined as not being connected in Step S164 (Step S164; No), authentication information is determined as not being contained in the recording medium in Step S165 (Step S165; No), the boot-up operation starts from the first recording medium 17 (Step S169), and the first program is booted by the OS of the first recording medium 17 (Step S170). If there is no agreement between the sum and specific Unlock key in Step S166 (Step S166; NG), the medium is determined as the recording medium third copied recording medium 55 currently connected to the information processing apparatus 10, authentication is not granted, as shown in FIG. 11 (B) (authentication NG). In this case as well, the boot-up operation starts from the first recording medium 17 (Step S169), and the first program is booted by the OS of the first recording medium 17 (Step S170).

As described above, in the fifth function for determining the genuineness using the specific Unlock key generated by the specific function from the created date in the file attribute of the authentication information file, the genuineness of the second recording medium 25 connected to the information processing apparatus 10 can be determined. This arrangement provides the same advantages as those of the second embodiment.

Embodiment 6

In the sixth embodiment, the following describes the authentication information generation apparatus that generates the authentication information (specific Unlock key) from the created date of the file attribute described with reference to the fifth embodiment, using the specific function.

Figure 13:
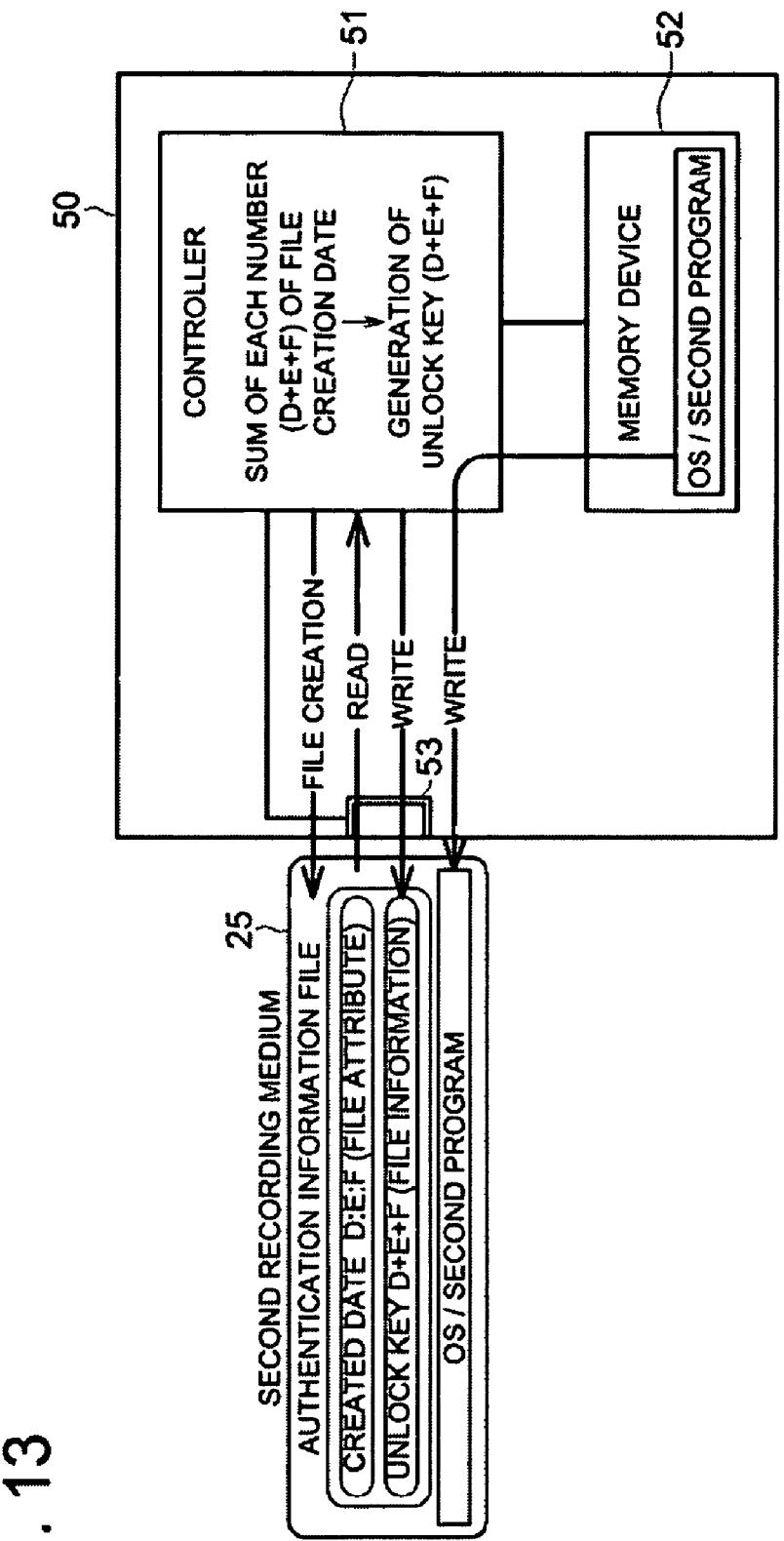
FIG. 13 is a diagram representing the major components of the recording medium manufacturing apparatus as a sixth embodiment of the present invention.

FIG. 13 shows the major components of the authentication information generation apparatus 50 as a sixth embodiment of the present invention. This authentication information generation apparatus 50 has the same structure as that of the fourth embodiment, except for the function of generating the authentication information stored in the second recording medium 25 (program for controlling the controller 51). Accordingly, detailed description will be omitted avoid duplication.

Figure 14:
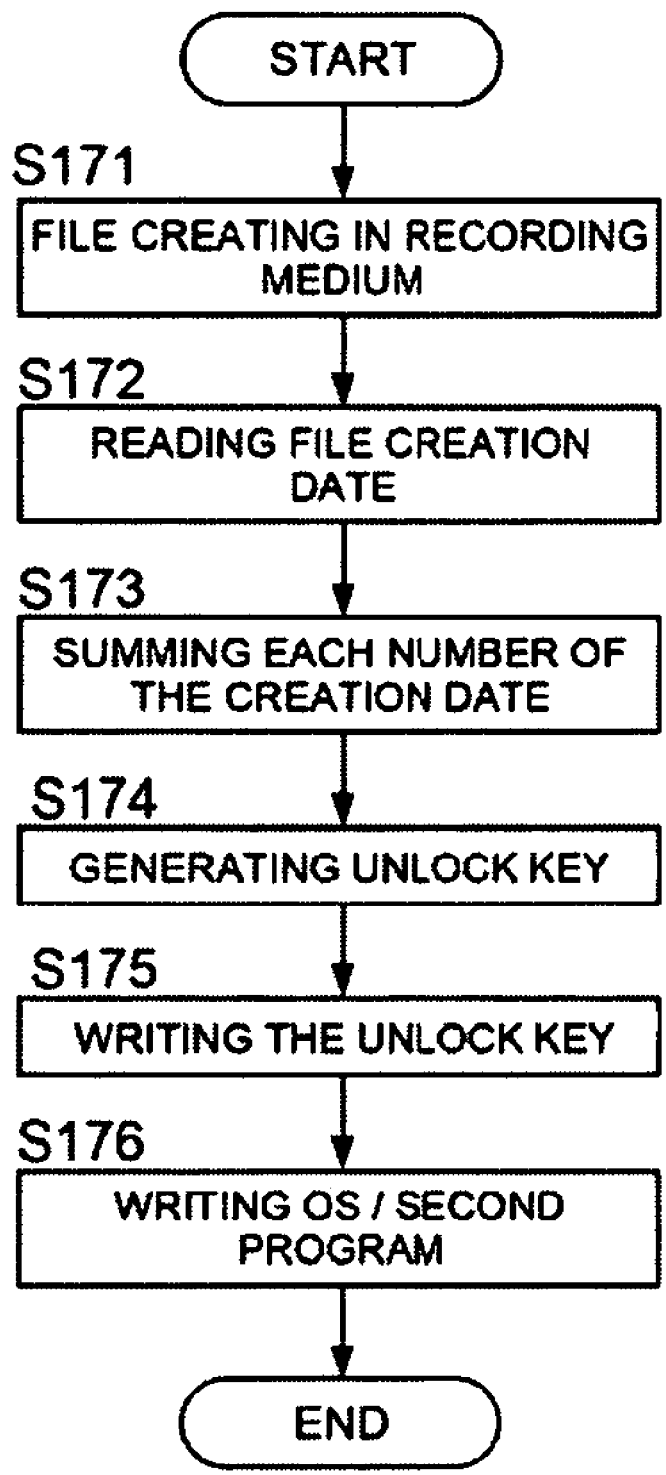
FIG. 14 is a flow diagram representing the operation of the recording medium manufacturing apparatus as a sixth embodiment of the present invention.
Figure 15:
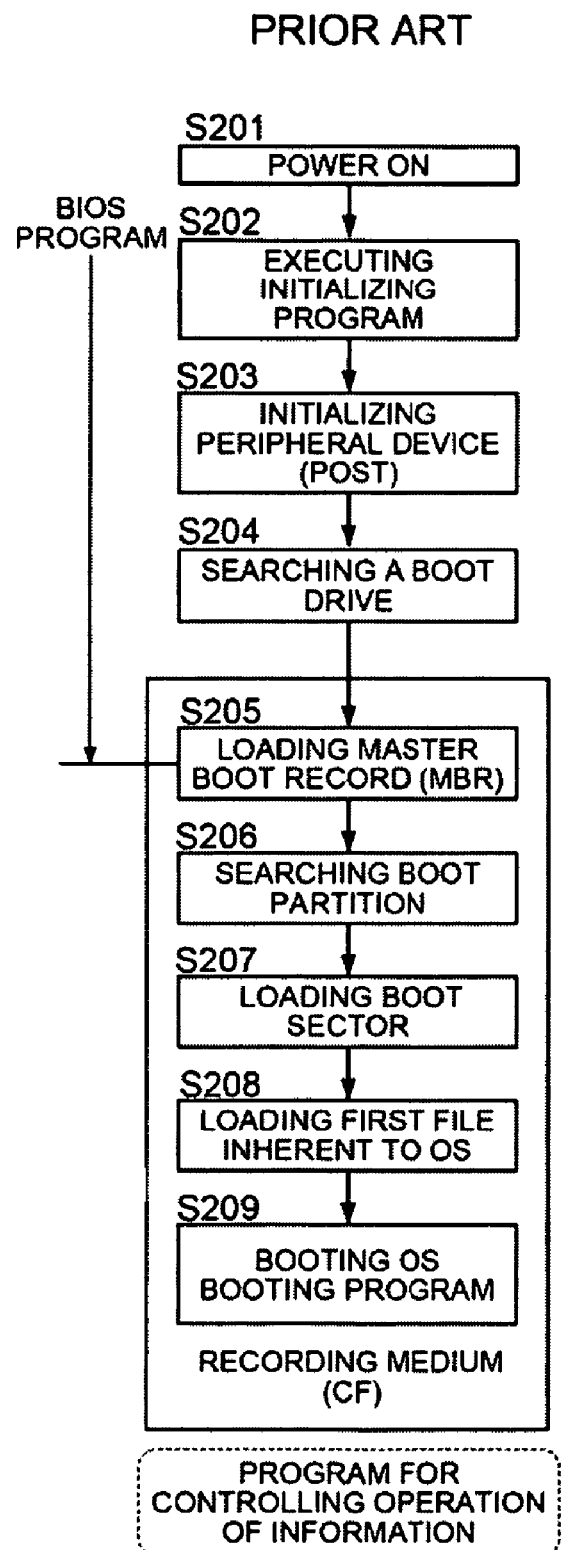
FIG. 15 is a diagram representing the operation of a conventional information processing apparatus at the time of booting.

FIG. 14 shows the flow of the process of generating the authentication information by authentication information generation apparatus 50 shown in FIG. 13, and storing information into the second recording medium 25.

The controller 51 of the authentication information generation: apparatus 50 creates an authentication information file in the second recording medium 25 connected to the connection section 53, or ensures that the authentication information file created by the authentication information generation apparatus 50 is copied into the second recording medium 25 (Step S171). The controller 51 also reads the created date in the file attribute of the authentication information file (Step S172), and adds the digits of the created date having been read (Step S173), whereby the specific Unlock key (authentication information) is generated (step S174). The generated specific Unlock key is written into the authentication information file of the second recording medium 25 (Step S175). Further, even when the second program is read from the memory device 52 into the OS, the controller 51 also writes the program into the second recording medium 25 (Step S176).

This authentication information generation apparatus 50 can generate the authentication information capable of determining the genuineness of the second recording medium 25 from the created date in the file attribute of the authentication information file stored in the second recording medium 25, using the specific function. It can also produce the second recording medium 25 provided with the authentication information capable of determining genuineness.

The embodiments of the present invention have been described with reference to diagrams. It is to be expressly understood, however, that the specific structure of the present invention is not restricted thereto. The present invention can be embodied in a great number of variations with appropriate modification or additions, without departing from the technological spirit and scope of the invention claimed.

For example, in the boot-up operation of the embodiment, the booting drives are sequentially searched according to the descending order of priority assigned by the setting of the BIOS, whereby the booting drive is determined. Without the booting drives being searched according to the descending order of priority, the following procedure can be applied: In the first place, all the booting drives mounted on (connected with) the information processing apparatus have been searched. If the second recording medium having been succeeded in authentication of the predetermined authentication information is connected, the boot-up operation starts from that second recording medium as a booting drive.

In the embodiment, without being restricted to the Compact Flash, the first recording medium formed as a first recording medium 17 can be made up of various forms of memory card of other specifications, or a storage device or ROM provided inside the information processing apparatus 10. In the embodiment, without being restricted the USB memory, the second recording medium constituted as a second recording medium 25 can be made up, for example, of a removable disk such as a flexible disk cartridge and MO (Magneto Optical disk), or various forms of memory card.

The specific function described with reference to the third through sixth embodiments is assumed the "sum" of the digits of the serial numbers inherent to the medium or the "sum" of the digits of the created date of the file attribute. In addition to that, the specific function can be the "rearranged value" formed by rearranging the digits of the serial numbers/created date according to a predetermined rule, or the "combined value" formed by inserting predetermined numerals into the serial number/created date according to a predetermined rule (e.g., at intervals of several digits).

The fifth and sixth embodiments have been described with reference to the case wherein the authentication information (specific Unlock key) is generated from the created date in the file attribute of the authentication information file stored in the second recording medium 25. However, the authentication information (specific Unlock key) can also generated from the created date in the file attribute of other files (e.g., program file) stored in the second recording medium 25. In this case, the specific Unlock key is generated from the created date in the file attribute of a predetermined file stored in the second recording medium 25, using the specific function. This specific Unlock key is stored in the authentication information file of the second recording medium 25. The information processing apparatus 10 is only required to have a function wherein, according to the decision on the genuineness (decision on authentication) of the second recording medium 25 being connected, a decision is made to see whether or not there is agreement between the result obtained by computing the specific function by the created date in the file attribute of a predetermined file contained in the second recording medium 25, and the specific Unlock key of the authentication information file contained in the second recording medium 25. If there is agreement, the product is determined as genuine (authenticated) whereas, if not, it is determined as non-genuine (not authenticated).

According to the embodiment of the present invention, the controller checks whether or not the second recording medium (external device) containing the predetermined authentication information is connected to the connection section of the information processing apparatus during BIOS boot-up operation. If connection has been confirmed, the second program stored in the second recording medium is booted. If connection cannot be confirmed, the first program stored in the first recording medium is booted.

As described above, authentication is performed to check whether or not the predetermined authentication information is stored in the second recording medium (external device) that is assumed to be connectable from the outside to the connection section of the information processing apparatus. This arrangement allows only the booting of the second program (specific program) stored in the second recording medium together with the predetermined authentication information, without the booting of any other program (non-specific program) being allowed. Thus, the non-specific program contained in the second recording medium, for example, is booted up, and this arrangement eliminates the possible access to the program in the information processing apparatus using the non-specific program, with the result that the booting drive can be switched over to the second recording medium as an external device on the BIOS level, while the security of the information processing apparatus is ensured.

Without having to perform the operation of changing the order of priority of the booting drives in the BIOS setup menu, the booting drive can be switched over to the second recording medium during BIOS boot-up operation. The second program stored in the second recording medium is booted up on the BIOS level (independently from the OS loaded on the information processing apparatus). This makes it possible to create a program characterized by a high degree of freedom, without depending on the OS of the apparatus.

To be more specific, when the booting drive is switched over to the external device (the second recording medium) during BIOS boot-up operation, the program of the external device is allowed to use the independent OS stored in that external device and the special program without OS, with the result that a higher degree of freedom is granted to the program. Further, independence of the OS or program of the apparatus eliminates the need of changing the OS of the apparatus in conformity to the program of the external device. What is required is only to change the program loaded on the external device. If a personal computer is available, it is possible to easily change the program loaded on the external device at any place.

According to the embodiment of the present invention, verification is made to see that the authentication information file containing the predetermined authentication information is stored in the second recording medium connected to the connection section of the information processing apparatus, and the difference between the created date in the file attribute of the authentication information file and the updated date is kept within a predetermined range. After that, the genuineness of the second recording medium is determined and program boot control is started.

In a newly created file, the created date of the file attribute indicates the created date (M1), and in the file created by copying this file, it indicates the copy date (M2) (M1≠M2). The updated date in the file attribute denotes the date when the file is updated. Even if the file is copied, the updated date (R2) of the copy file undergoes no change, and is equal to the updated date (R1) of the file as a copy source (R1=R2). Further, in the file newly created in the recording medium, the created date of the file attribute (M1) is almost the same with the updated date (R1) (M1≈R1). In the file copied within the recording medium, a difference occurs between the created date of the file attribute (M2) and updated date (R2) (difference between actual created date and copy date).

Thus, if verification is made to ensure that the difference between the created date in the file attribute of the authentication information file stored in the second recording medium, and the updated date is kept within a predetermined range, the second recording medium can be determined as genuine. Then the second program stored in the second recording medium is booted up. If verification fails, the second recording medium can be determined as non-genuine, and the first program stored in the first recording medium is booted up.

According to the embodiment of the present invention, verification is made to see that the authentication information file containing the predetermined authentication information is stored in the second recording medium connected to the connection section of the information processing apparatus, and that there is agreement between the created date described in the authentication information file and the created date in the file attribute of the authentication information file. After that, the genuineness of the second recording medium is determined and the program boot control is applied.

For example, the created date in the file attribute of the authentication information file newly created in the second recording medium is verified by the personnel having created the file. The information indicating the created date thereof is stored in the authentication information file. This arrangement ensures agreement between the created date (N1)

described in the authentication information file and the created date (M1) in the file attribute of the authentication information file (N1=M1).

If this authentication information file is copied into another recording medium to create a copy file, the created date of the file attribute in the copy file is changed into the copy date. Thus, there is no agreement between the created date (N11) described in the file, and the created date (M2) of the file attribute actually representing the copy date (N1≠M2).

Accordingly, if verification has been made to prove that there is agreement between the created date described in the authentication information file described in the second recording medium, and the created date in the file attribute of the authentication information file, then the second recording medium is determined as genuine and the second program stored in the second recording medium is booted up. If verification fails, the second recording medium can be determined as non-genuine, and the first program stored in the first recording medium is booted up.

According to the embodiment of the present invention, the authentication information stored in the second recording medium is generated from the inherent information contained in the second recording medium using a specific function. This inherent information is different for each recording medium, and therefore, the inherent authentication information different for each recording medium can be created.

Thus, if verification has been made to prove that there is agreement between the result of computing the inherent information of the recording medium contained in the second recording medium connected to the information processing apparatus using the specific function, and authentication information stored in the second recording medium, the second recording medium can be determined as genuine, and the second program contained in the second recording medium is booted up. If verification fails, the second recording medium can be determined as non-genuine, and the first program stored in the first recording medium is booted up.

According to the embodiment of the present invention, the authentication information contained in the second recording medium is generated from the created date in the file attribute of a predetermined file recorded in the second recording medium using the specific function. When this file is copied into another recording medium, the created date in the file attribute of the copy file is changed to the copy date.

Thus, if verification has been made to prove that there is agreement between the result of computing the created date in the file attribute of the file recorded in the second recording medium connected to the information processing apparatus using the specific function, and authentication information stored in the second recording medium, the second recording medium can be determined as genuine, and the second program contained in the second recording medium is booted up. If verification fails, the second recording medium can be determined as non-genuine, and the first program stored in the first recording medium is booted up.

The information processing apparatus and program of the present invention are capable of switching the booting drive over to the external recording medium during BIOS boot-up operation, while ensuring the security of the apparatus.

The present invention can be applied not only to the digital multifunction peripheral described with reference to the embodiment but also to other information processing apparatus such as a personal computer.

What is claimed is:

1. An information processing apparatus comprising:
a first recording medium which stores a first program;
a connection section which is capable of connecting with a second recording medium from outside; and
a controller which determines, during BIOS boot-up operation, whether or not (1) an authentication information file containing predetermined authentication information is stored in the second recording medium connected to the connection section, and whether or not (2) a difference between a created date and an updated date, in a file attribute of the authentication information file, is within a predetermined range, and if the above (1) and (2) are verified, boots a second program stored in the second recording medium whereas, if (1) and (2) are not verified, boots the first program.

2. The information processing apparatus of claim 1, wherein the first recording medium is an internal device, provided in the information processing apparatus, comprising a storage device and a ROM; and the second recording medium is an external device comprising a USB memory.

3. The information processing apparatus of claim 1, wherein the second program comprises at least one of a diagnostic tool, a log collection program, and a program for automatically updating the first program.

4. The information processing apparatus of claim 1, wherein the authentication information comprises at least one of a password and an authentication code.

5. An information processing apparatus comprising:
a first recording medium which stores a first program;
a connection section which is capable of connecting with a second recording medium from outside; and
a controller which determines, during BIOS boot-up operation, whether or not (1) an authentication information file containing predetermined authentication information is stored in the second recording medium connected to the connection section, and whether or not (2) a created date described in the authentication information file agrees with a created date in a file attribute of the authentication information file, where the created date in the file attribute being rewritten upon a change or an operation, and if the above (1) and (2) are verified, boots a second program stored in the second recording medium whereas, if (1) and (2) are not verified, boots the first program.

6. The information processing apparatus of claim 5, wherein the first recording medium is an internal device, provided in the information processing apparatus, comprising a storage device and a ROM; and the second recording medium is an external device comprising a USB memory.

7. The information processing apparatus of claim 5, wherein the second program comprises at least one of a diagnostic tool, a log collection program, and a program for automatically updating the first program.

8. The information processing apparatus of claim 5, wherein the authentication information comprises at least one of a password and an authentication code.

9. A computer readable recording medium recorded thereon a program for allowing an information processing apparatus to operate in such a way that, during BIOS boot-up operation, the information apparatus determines whether or not (1) an authentication information file containing predetermined authentication information is stored in a second recording medium connected to the connection section from outside, and whether or not (2) a difference between a created date and an updated date, in a file attribute of the authentication information file, is within a predetermined range, and if the above (1) and (2) are verified, boots a second program stored in the second recording medium whereas, if (1) and (2) are not verified, boots the first program.

10. A computer readable recording medium recorded thereon a program for allowing an information processing apparatus to operate in such a way that, during BIOS boot-up operation, the information apparatus determines whether or not (1) an authentication information file containing predetermined authentication information is stored in a second recording medium connected to the connection section from outside, and whether or not (2) a created date described in the authentication information file agrees with a created date in a file attribute of the authentication information file, where the created date in the file attribute having been rewritten upon a change or an operation applied to the file and if the above (1) and (2) are verified, boots a second program stored in the second recording medium whereas, if (1) and (2) are not verified, boots a first program.

* * * * *